US009971993B2

(12) United States Patent
Cheng et al.

(10) Patent No.: US 9,971,993 B2
(45) Date of Patent: May 15, 2018

(54) LEVERAGING A SOCIAL GRAPH FOR USE WITH ELECTRONIC MESSAGING

(75) Inventors: Heyning Cheng, San Jose, CA (US); Daniel Tunkelang, Mountian View, CA (US); Bradley Scott Mauney, Mountain View, CA (US); Ashley Woodman Hall, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 473 days.

(21) Appl. No.: 13/430,284

(22) Filed: Mar. 26, 2012

(65) Prior Publication Data
US 2013/0254303 A1 Sep. 26, 2013

(51) Int. Cl.
G06F 15/16 (2006.01)
G06Q 10/10 (2012.01)
H04L 12/58 (2006.01)
G06Q 50/00 (2012.01)

(52) U.S. Cl.
CPC .......... *G06Q 10/101* (2013.01); *G06Q 50/01* (2013.01); *H04L 51/02* (2013.01); *H04L 51/32* (2013.01)

(58) Field of Classification Search
CPC ......... H04L 51/32; H04L 51/02; G06Q 50/01; G06Q 10/101; G06F 17/30958; G06F 17/30961; G06F 17/30554
USPC .......... 709/206, 201–203; 705/319; 715/738, 715/739; 707/748, 758
See application file for complete search history.

(56) References Cited

U.S. PATENT DOCUMENTS

| | | |
|---|---|---|
| 6,594,673 B1 | 7/2003 | Smith et al. |
| 7,512,612 B1 | 3/2009 | Akella et al. |
| 7,539,697 B1 | 5/2009 | Akella |
| (Continued) | | |

FOREIGN PATENT DOCUMENTS

| | | |
|---|---|---|
| CN | 102117325 A | 7/2011 |
| CN | 102156910 A | 8/2011 |
| (Continued) | | |

OTHER PUBLICATIONS

"U.S. Appl. No. 13/482,884, Non Final Office Action dated Jul. 15, 2013", 19 pgs.
(Continued)

*Primary Examiner* — Abdulkader M Alriyashi
(74) *Attorney, Agent, or Firm* — Schwegman Lundberg & Woessner, P.A.

(57) ABSTRACT

Techniques for analyzing a social graph of a social network service to identify and then present connection paths connecting various entities are described. With some embodiments, subsequent to a user selecting or otherwise identifying a person to whom a message is to be communicated, a social graph is analyzed to identify connection paths connecting the message sender, or an entity on whose behalf the message sender is acting, to the message recipient. The social graph is implemented with a graph data structure having nodes and edges representing entities and associations between entities, respectively. With some embodiments, the nodes represent people, companies, educational institutions (e.g., schools, universities, etc.), and groups. After identifying the connection paths, the connection path having the highest path score, as derived by aggregating edge scores assigned to the edges, may be presented.

20 Claims, 17 Drawing Sheets

(56) References Cited

U.S. PATENT DOCUMENTS

| | | |
|---|---|---|
| 7,593,740 B2 | 9/2009 | Crowley et al. |
| 7,945,862 B2 | 5/2011 | Aldrich et al. |
| 8,060,451 B2 | 11/2011 | Degeratu et al. |
| 8,412,564 B1 | 4/2013 | Thell et al. |
| 8,650,177 B2 | 2/2014 | Skomoroch et al. |
| 8,661,034 B2 | 2/2014 | Polonsky et al. |
| 8,825,785 B1 | 9/2014 | Shah et al. |
| 8,935,263 B1 | 1/2015 | Rodriguez et al. |
| 8,938,690 B1 | 1/2015 | Khouri et al. |
| 9,087,321 B2 | 7/2015 | Neal et al. |
| 9,137,323 B2 | 9/2015 | Shah et al. |
| 9,225,788 B2 | 12/2015 | Naveh et al. |
| 9,536,439 B1 | 1/2017 | Goldstein et al. |
| 9,654,592 B2 | 5/2017 | Jayaram et al. |
| 2001/0032244 A1 | 10/2001 | Neustel |
| 2002/0181685 A1 | 12/2002 | Doherty et al. |
| 2003/0187813 A1 | 10/2003 | Goldman et al. |
| 2005/0015432 A1 | 1/2005 | Cohen |
| 2005/0159970 A1* | 7/2005 | Buyukkokten et al. ........ 705/1 |
| 2005/0165594 A1 | 7/2005 | Chandra et al. |
| 2006/0042483 A1 | 3/2006 | Work et al. |
| 2006/0136419 A1 | 6/2006 | Brydon et al. |
| 2006/0184464 A1 | 8/2006 | Tseng et al. |
| 2006/0218111 A1 | 9/2006 | Cohen |
| 2006/0229896 A1 | 10/2006 | Rosen et al. |
| 2006/0287970 A1 | 12/2006 | Chess et al. |
| 2007/0106780 A1 | 5/2007 | Farnham et al. |
| 2007/0202475 A1 | 8/2007 | Habichler et al. |
| 2008/0065481 A1 | 3/2008 | Immorlica et al. |
| 2008/0077461 A1 | 3/2008 | Glick |
| 2008/0140680 A1 | 6/2008 | Hyder et al. |
| 2008/0172415 A1 | 7/2008 | Fakhari et al. |
| 2008/0288612 A1 | 11/2008 | Kwon |
| 2008/0313000 A1 | 12/2008 | Degeratu et al. |
| 2009/0006193 A1 | 1/2009 | Forbes et al. |
| 2009/0027392 A1 | 1/2009 | Jadhav et al. |
| 2009/0112995 A1* | 4/2009 | Addae et al. .............. 709/206 |
| 2009/0193037 A1* | 7/2009 | Yu ................ G06F 17/30604 |
| 2009/0228830 A1 | 9/2009 | Herz et al. |
| 2009/0282107 A1* | 11/2009 | O'Sullivan et al. ........ 709/206 |
| 2009/0299990 A1 | 12/2009 | Setlur et al. |
| 2010/0036934 A1 | 2/2010 | Bruster |
| 2010/0076989 A1* | 3/2010 | Jakobson .................. 707/758 |
| 2010/0082427 A1 | 4/2010 | Burgener et al. |
| 2010/0161369 A1 | 6/2010 | Farrell et al. |
| 2010/0169364 A1* | 7/2010 | Hardt ....................... 707/769 |
| 2010/0293247 A1* | 11/2010 | McKee et al. ............. 709/218 |
| 2010/0318613 A1 | 12/2010 | Souza et al. |
| 2011/0078188 A1 | 3/2011 | Li et al. |
| 2011/0161129 A1 | 6/2011 | Barsoba et al. |
| 2011/0177483 A1 | 7/2011 | Needham et al. |
| 2011/0196924 A1 | 8/2011 | Hargarten et al. |
| 2011/0209068 A1 | 8/2011 | Vemuri |
| 2011/0213785 A1* | 9/2011 | Kristiansson et al. ...... 707/748 |
| 2011/0238591 A1 | 9/2011 | Kerr et al. |
| 2011/0258042 A1 | 10/2011 | Purvy et al. |
| 2011/0288851 A1 | 11/2011 | Duan |
| 2011/0302159 A1 | 12/2011 | Mikesell et al. |
| 2012/0023030 A1 | 1/2012 | Jeffries |
| 2012/0095933 A1 | 4/2012 | Goldberg |
| 2012/0096002 A1* | 4/2012 | Sheehan ............... G06Q 50/01 707/737 |
| 2012/0110071 A1 | 5/2012 | Zhou et al. |
| 2012/0166535 A1 | 6/2012 | Deng et al. |
| 2012/0197733 A1 | 8/2012 | Skomoroch et al. |
| 2012/0197863 A1 | 8/2012 | Skomoroch et al. |
| 2012/0197906 A1 | 8/2012 | Landau et al. |
| 2012/0197993 A1 | 8/2012 | Skomoroch et al. |
| 2012/0226623 A1 | 9/2012 | Jurney et al. |
| 2012/0233197 A1 | 9/2012 | Tsai et al. |
| 2012/0259791 A1 | 10/2012 | Zoidze |
| 2012/0310927 A1 | 12/2012 | Johnson et al. |
| 2012/0311462 A1 | 12/2012 | Devecka |
| 2013/0013489 A1 | 1/2013 | Kremen et al. |
| 2013/0013526 A1 | 1/2013 | Le Viet et al. |
| 2013/0091071 A1 | 4/2013 | Davies |
| 2013/0124268 A1 | 5/2013 | Hatton et al. |
| 2013/0159325 A1 | 6/2013 | Polonsky et al. |
| 2013/0212032 A1 | 8/2013 | Cox et al. |
| 2013/0254213 A1 | 9/2013 | Cheng et al. |
| 2013/0254305 A1 | 9/2013 | Cheng et al. |
| 2014/0025427 A1 | 1/2014 | Bastian et al. |
| 2014/0081928 A1 | 3/2014 | Skomoroch et al. |
| 2014/0129631 A1 | 5/2014 | Jayaram et al. |
| 2014/0164512 A1 | 6/2014 | Allen et al. |
| 2014/0164952 A1 | 6/2014 | Allen et al. |
| 2014/0358607 A1 | 12/2014 | Gupta et al. |
| 2015/0026120 A1 | 1/2015 | Chrapko et al. |
| 2015/0142767 A1 | 5/2015 | Wu et al. |
| 2017/0161668 A1 | 6/2017 | Jayaram et al. |

FOREIGN PATENT DOCUMENTS

| | | |
|---|---|---|
| CN | 103502975 A | 1/2014 |
| DE | 212013000002 U1 | 9/2013 |
| EP | 2673718 B1 | 11/2016 |
| JP | 2009134520 A | 6/2009 |
| WO | WO-2013131108 A1 | 9/2013 |

OTHER PUBLICATIONS

"U.S. Appl. No. 13/482,884, Non Final Office Action dated Oct. 3, 2012", 19 pgs.

"U.S. Appl. No. 13/482,884, Response filed Jan. 2, 2013 to Non Final Office Action dated Oct. 3, 2012", 11 pgs.

"U.S. Appl. No. 13/482,884, Response filed Oct. 15, 2013 to Non Final Office Action dated Jul. 15, 2013", 11 pgs.

"International Application Serial No. PCT/US2013/033857, International Search Report dated Jul. 2, 2013", 2 pgs.

"International Application Serial No. PCT/US2013/033857, Written Opinion dated Jul. 2, 2013", 7 pgs.

U.S. Appl. No. 13/548,957, filed Jul. 13, 2012, Techniques for Identifying and Presenting Connection Paths.

U.S. Appl. No. 13/482,884, filed May 29, 2012, Techniques for Identifying and Presenting Connection Paths.

"U.S. Appl. No. 13/357,171, Non Final Office Action dated Jun. 17, 2013", 9 pgs.

"U.S. Appl. No. 13/357,171, Notice of Allowance dated Oct. 1, 2013", 10 pgs.

"U.S. Appl. No. 13/357,171, Response filed Sep. 17, 2013 to Non Final Office Action dated Jun. 17, 2013", 12 pgs.

"U.S. Appl. No. 13/357,360, Final Office Action dated Jun. 27, 2013", 22 pgs.

"U.S. Appl. No. 13/357,360, Non Final Office Action dated Oct. 11, 2012", 13 pgs.

"U.S. Appl. No. 13/357,360, Response filed Mar. 18, 2013 to Non Final Office Action dated Oct. 11, 2012", 17 pgs.

"U.S. Appl. No. 13/357,360, Response filed Nov. 20, 2013 to Final Office Action dated Jun. 27, 2013", 18 pgs.

"U.S. Appl. No. 13/482,884, Final Office Action dated Feb. 6, 2014", 19 pgs.

"U.S. Appl. No. 14/072,955, Non Final Office Action dated May 9, 2014", 11 pgs.

"U.S. Appl. No. 14/072,955, Preliminary Amendment filed Dec. 10, 2013", 10 pgs.

"European Application Serial No. 13733942.0, Office Action dated Nov. 4, 2013", 2 pgs.

"International Application Serial No. PCT/US2013/068763, International Search Report dated May 2, 2014", 2 pgs.

"International Application Serial No. PCT/US2013/068763, Written Opinion dated May 2, 2014", 5 pgs.

Ackerman, Mark, "Sharing Expertise: Beyond Knowledge Management", The MIT Press (Cambridge, Massachusetts), (2003), 438 pgs.

Becerra-Fernandez, Irma, "Searching for Experts on the Web: A Review of Contemporary Expertise Locator Systems", ACM Transactions on Internet Technology 6(4), (Nov. 2006), 333-355.

D'Amore, Raymond, "Expertise Community Detection", SIGIR, (Jul. 25-29, 2004), 498-499.

(56) References Cited

OTHER PUBLICATIONS

Dom, Byron, et al., "A Bayesian Technique for Estimating the Credibility of Question Answerers", SIAM, (2008), 399-409.
Dom, Byron, et al., "Graph-Based Ranking Algorithms for E-mail Expertise Analysis", DMKD, (Jun. 13, 2003), 42-48.
Fu, Yupeng, et al., "Finding Experts Using Social Network Analysis", IEEE/WIC/ACM International Conference on Web Intelligence, (2007), 77-80.
Grolmus, Petr, et al., "A Web-Based User-Profile Generator: Foundation for a Recommender and Expert Finding System", 8th ICCC International Conference on Electronic Publishing, (Jun. 2004), 331-342.
Haselmann, Till, et al., "Towards a Conceptual Model for Trustworthy Skills Profiles in Online Social Networks", ERCIS, (2010), 13 pgs.
Huh, Eui-Nam, et al., "A Framework of Online Community based Expertise Information Retrieval on Grid", Kyung Hee University Memo, (Aug. 11, 2008), 21 pgs.
Huh, Eui-Nam, et al., "A Framework of Online Community based Expertise Information Retrieval on Grid", Kyung Hee University Memo, (Jan. 14, 2010), 21 pgs.
John, Ajita, et al., "Collaborative Tagging and Expertise in the Enterprise", WWW2006, (May 22-26, 2006), 6 pgs.
Li, Juanzi, et al., "EOS: Expertise Oriented Search Using Social Networks", WWW 2007 / Poster Paper, (May 8-12, 2007), 1271-1272.
Lin, Ching-Yung, et al., "SmallBlue: Social Network Analysis for Expertise Search and Collective Intelligence", IEEE International Conference on Data Engineering, (2009), 4 pgs.
Malek, Maria, et al., "Exhaustive and Guided Algorithms for Recommendation in a Professional Social Network", EISTI-Laris laboratory, PRES Cergy University, (Jul. 31, 2010), 19 pgs.
Meyer, Bertolt, et al., "skillMap: dynamic visualization of shared organizational context", Institute of Information Systems, Humboldt University Berlin, (Feb. 20, 2006), 13 pgs.
Pretschner, Alexander, "Ontology Based Personalized Search", Department of Electrical Engineering and Computer Science, University of Kansas, (1998), 125 pgs.
Stankovic, Milan, et al., "Looking for Experts? What can Linked Data do for you?", LDOW, (Apr. 27, 2010), 10 pgs.
Steggles, Andy, "Keeping Score of Your Online Member Engagement", Associations Now, [Online]. Retrieved from the Internet: <URL: http://www.asaecenter.org/Resources/ANowDetail.cfm?ItemNumber=3828>, (Jan. 2009), 7 pgs.
Tang, Jie, et al., "ArnetMiner: An Expertise Oriented Search System for Web Community", International Semantic Web Conference—ISWC, (2007), 8 pgs.
Yimam-Seid, Dawit, et al., "Expert Finding Systems for Organizations: Problem and Domain Analysis and the DEMOIR Approach", Journal of Organizational Computing and Electronic Commerce 13(1), (2003), 1-24.
Zhang, Jing, et al., "Expert Finding in a Social Network", Department of Computer Science and Technology, Tsinghua, University Database Systems for Advanced Applications—DASFAA, (2007), 1066-1069.
"U.S. Appl. No. 13/482,884, Non Final Office Action dated Nov. 19, 2014", 23 pgs.
"U.S. Appl. No. 13/482,884, Response filed Mar. 19, 2015 to Non Final Office Action dated Nov. 19, 2014", 25 pgs.
"U.S. Appl. No. 13/482,884, Response filed Jul. 7, 2014 to Final Office Action dated Feb. 6, 2014", 12 pgs.
"U.S. Appl. No. 13/672,377, Non Final Office Action dated Dec. 4, 2014", 9 pgs.
"U.S. Appl. No. 13/672,377, Response filed Apr. 6, 2015 to Non Final Office Action dated Dec. 4, 2014", 13 pgs.
"International Application Serial No. PCT/US2013/033857, International Preliminary Report on Patentability dated Oct. 9, 2014", 9 pgs.
"U.S. Appl. No. 13/548,957, Non Final Office Action dated Jun. 18, 2015", 20 pgs.
"U.S. Appl. No. 13/672,377, Final Office Action dated Jul. 2, 2015", 8 pgs.
"U.S. Appl. No. 13/548,957, Final Office Action dated Apr. 5, 2016", 25 pgs.
"U.S. Appl. No. 13/672,377, Non Final Office Action dated Feb. 26, 2016", 12 pgs.
"European Application Serial No. 13733942.0, Response filed Feb. 24, 2016 to Office Action dated Nov. 4, 2013", 24 pgs.
"U.S. Appl. No. 13/482,884, Non Final Office Action dated Jul. 16, 2015", 26 pgs.
"U.S. Appl. No. 13/482,884, Response filed Jan. 19, 2016 to Non Final Office Action dated Jul. 16, 2015", 18 pgs.
"U.S. Appl. No. 13/548,957, Response fled Dec. 18, 2015 to Non Final Office Action dated Jun. 18, 2015", 13 pgs.
"U.S. Appl. No. 13/672,377, Response filed Dec. 17, 2015 to Final Office Action dated Jul. 2, 2015", 12 pgs.
"U.S. Appl. No. 13/710,248, Final Office Action dated Mar. 30, 2015", 23 pgs.
"U.S. Appl. No. 13/710,248, Non Final Office Action dated Nov. 17, 2014", 21 pgs.
"U.S. Appl. No. 13/710,248, Response filed Mar. 17, 2015 to Non Final Office Action dated Nov. 17, 2014", 14 pgs.
"U.S. Appl. No. 13/716,003, Non Final Office Action dated Dec. 19, 2014", 13 pgs.
"U.S. Appl. No. 13/716,003. Response filed Apr. 20, 2015 to Non Final Office Action dated Dec. 19, 2014", 11 Pgs.
"CollegeView", Wayback machine on Nov. 10, 2014, [Online]. Retrieved from the Internet: <http://www.collegeview.com/index.jsp>, (Nov. 23, 2012), 1 pg.
"European Application Serial No. 13733942.0, Extended European Search Report dated Jul. 29, 2015", 8 pgs.
"U.S. Appl. No. 13/548,957, Response filed Dec. 27, 2016 to Non Final Office Action dated Jul. 25, 2016", 19 pgs.
"U.S. Appl. No. 13/672,377, Corrected Notice of Allowance dated Feb. 7, 2017", 2 pgs.
"U.S. Appl. No. 13/672,377, Notice of Allowance dated Jan. 17, 2017", 6 pgs.
"U.S. Appl. No. 13/672,377, Response filed Dec. 19, 2016 to Advisory Action dated Nov. 25, 2016", 14 pgs.
"Chinese Application Serial No. 201380000431.1, Office Action dated Nov. 16, 2016", with English translation of claims, 8 pgs.
"Chinese Application Serial No. 201380000431.1, Response filed Feb. 1, 2017 to Office Action dated Nov. 16, 2016", (English Translation of Claims), 11 pgs.
"U.S. Appl. No. 13/482,884, Final Office Action dated May 19, 2016", 30 pgs.
"U.S. Appl. No. 13/482,884, Response filed Oct. 19, 2016 to Final Office Action dated May 19, 2016", 15 pgs.
"U.S. Appl. No. 13/548,957, Non Final Office Action dated Jul. 25, 2016", 33 pgs.
"U.S. Appl. No. 13/548,957, Response filed Jun. 27, 2016 to Final Office Action dated Apr. 5, 2016", 16 pgs.
"U.S. Appl. No. 13/672,377, Advisory Action dated Nov. 25, 2016", 4 pgs.
"U.S. Appl. No. 13/672,377, Final Office Action dated Aug. 18, 2016", 12 pgs.
"U.S. Appl. No. 13/672,377, Response filed Jul. 26, 2016 to Non Final Office Action dated Feb. 26, 2016", 11 pgs.
"U.S. Appl. No. 13/672,377, Response filed Oct. 18, 2016 to Final Office Action dated Aug. 18, 2016", 13 pgs.
"Chinese Application Serial No. 201380000431.1, Office Action dated Mar. 2, 2016", W/ English Translation, 21 pgs.
"Chinese Application Serial No. 201380000431.1, Response filed Jul. 19, 2016 to Office Action dated Mar. 2, 2016", (English Translation of Claims), 19 pgs.
"U.S. Appl. No. 13/548,957, Final Office Action dated Mar. 24, 2017", 32 pgs.
"Chinese Application Serial No. 201380000431.1, Office Action dated May 5, 2017", W/English Translation, 7 pgs.
"Chinese Application Serial No. 201380000431.1, Response filed Jul. 20, 2017 to Office Action dated May 5, 2017", with English translation of claims, 11 pgs.

(56) References Cited

OTHER PUBLICATIONS

"U.S. Appl. No. 13/482,884, Examiner Interview Summary dated Nov. 17, 2017", 3 pgs.
"U.S. Appl. No. 13/482,884, Non Final Office Action dated Aug. 25, 2017", 31 pgs.
"U.S. Appl. No. 15/441,529, Non Final Office Action dated Nov. 17, 2017", 7 pgs.
"European Application No. 16002383.4, Extended European Search Report dated Mar. 22, 2017", 7 pgs.
"European Application No. 16002383.4, Response filed Oct. 18, 2017 to Extended European Search Report dated Mar. 22, 2017", 19.

* cited by examiner

MESSAGE APP

Copy Suggestion      Click to Insert and Edit

Hello John,

I am connected to Jane Doe, who I believe you may know as well. Like you, I have an MBA from Harvard Business School.

We have a career opportunity that might be a great match with your skills and experience. When you have a moment, please check out my Member Profile, and let me know if you would like to hear more about our company and available positions.

Hope to hear from you soon,

-Ashley

168

142

INSIGHTS AND COPY SUGGESTIONS    148

John is interested in
(Career opportunities)
Consulting Offers
New ventures
Job inquiries
Expertise requests
Business Deals
Getting back in touch

Contact Advice
*"I accept contact through Message App*
*... If you drop me one I will respond."*

Strongest Associations in Common    166

JANE DOE
Silicon Valley Innovation, Social Netw ....
You are both connected to Jane

Harvard Business School
You both hold an MBA from here

Internet Industry
You both hold work in the same industry

SEE MORE ASSOCIATIONS IN COMMON (SEND) or CANCEL

SEE CONNECTION PATHS TO JOHN

FIG. 12

LEVERAGING A SOCIAL GRAPH FOR USE WITH ELECTRONIC MESSAGING

TECHNICAL FIELD

The present disclosure generally relates to data processing systems. More specifically, the present disclosure relates to methods, systems and computer program products that improve the overall user experience for an electronic messaging application by leveraging a social graph to identify and then present contextual information concerning connection paths that exist between a message sender or some entity on whose behalf the message sender is acting, and a potential message recipient.

BACKGROUND

Online social network services provide users with a mechanism for defining, and memorializing in a digital format, their relationships with other people. This digital representation of real-world relationships is frequently referred to as a social graph. Many social network services utilize a social graph to facilitate electronic communications and the sharing of information between its users or members. For instance, the relationship between two members of a social network service, as defined in the social graph of the social network service, may determine the access and sharing privileges that exist between the two members. As such, the social graph in use by a social network service may determine the manner in which two members of the social network service can interact with one another via the various communication and sharing mechanisms supported by the social network service.

Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

With many social network services, members are prompted to provide a variety of personal information, which may be displayed in a member's personal web page. Such information is commonly referred to as "personal profile information", or simply "profile information", and when shown collectively, it is commonly referred to as a member's profile. For example, with some of the many social network services in use today, the personal information that is commonly requested and displayed as part of a member's profile includes a member's age (e.g., birth date), gender, contact information, home town, address, the name of the member's spouse and/or family members, a photograph of the member, interests, and so forth. With certain social network services, such as some business network services, a member's personal information may include information commonly included in a professional resume or curriculum vitae, such as information about a person's education, employment history, job skills, professional organizations, and so forth. With some social network services, a member's profile may be viewable to the public by default, or alternatively, the member may specify that only some portion of the profile is to be public by default. As such, many social network services serve as a sort of directory of people to be searched and browsed.

Because social network services are a rich source of information about people, social network services are an extremely useful tool when performing certain tasks. For example, many people use social network services to search for, and/or browse, member profiles that exhibit various desired characteristics. For instance, a job recruiter may search for persons who have profiles indicating the possession of certain technical skills, and educational and professional experiences and backgrounds. Similarly, when someone needs to hire a person employed in a particular profession (e.g., a general contractor, a doctor, a lawyer, a landscaper, a plumber, an investment banker, and so forth), that person may turn to a social network service to identify persons who possess the requisite skills and qualifications. In another scenario, a person may desire to contact someone for the purpose of exploring or proposing the possibility of a particular business arrangement or relationship. Accordingly, the person may use a social network service to identify the appropriate persons to contact.

DESCRIPTION OF THE DRAWINGS

Some embodiments are illustrated by way of example and not limitation in the FIGs. of the accompanying drawings, in which:

FIGS. 10 through 13 are examples of user interfaces for use with a messaging application that implements a method (such as that described in connection with FIG. 9), consistent with some embodiments of the invention;

DETAILED DESCRIPTION

Figure 1:
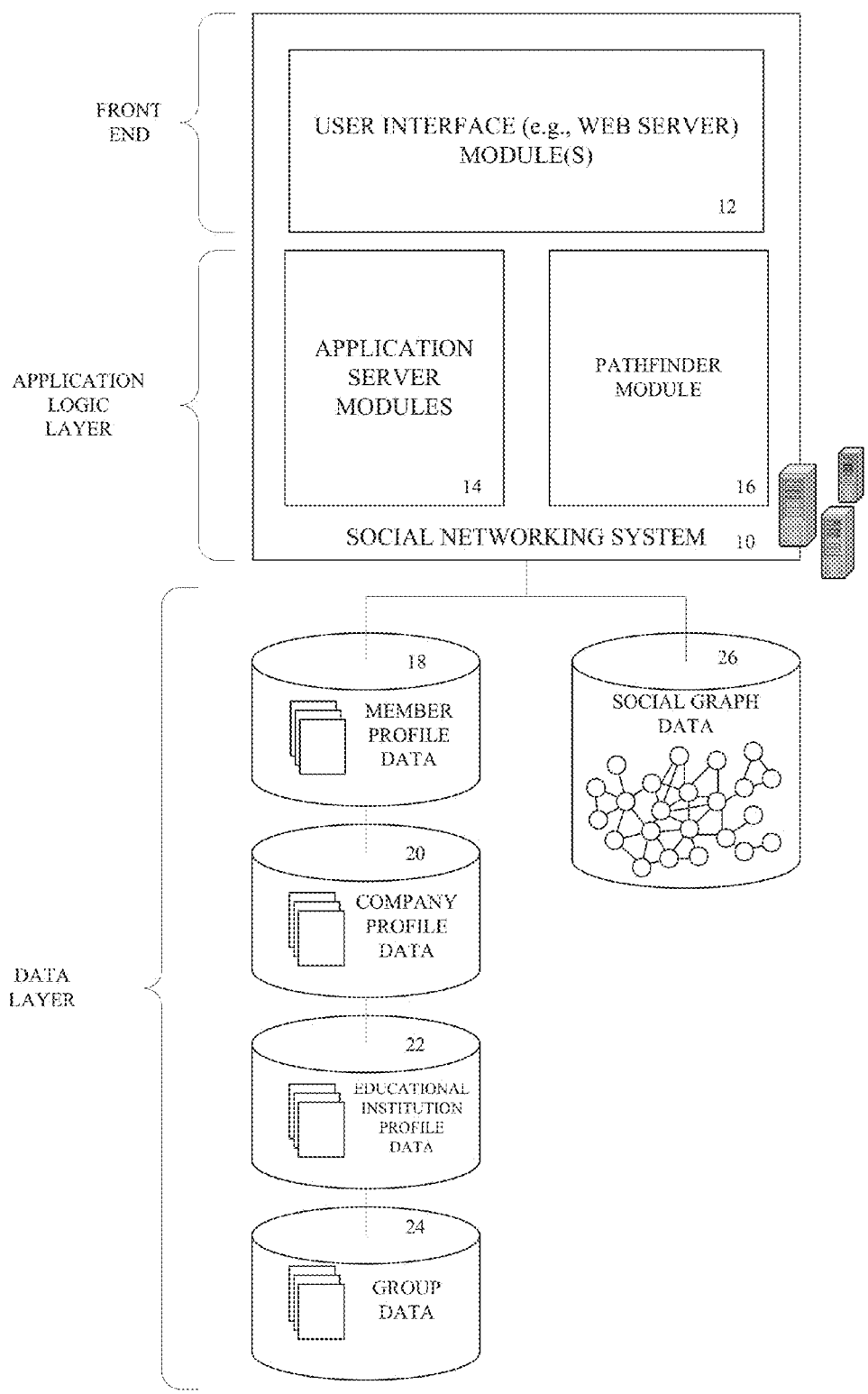
FIG. 1 is a block diagram illustrating various functional components of a social network system with a pathfinder module, consistent with some embodiments of the invention, for use with a wide variety of applications, and specifically for identifying and then presenting connection paths in a social graph connecting a user with a target member of the social network service.

The present disclosure describes methods, systems and computer program products for improving the user experience of various electronic messaging mechanisms by leveraging a social graph of a social network service to identify and convey information about various connection paths, as defined in the social graph, connecting a message sender to a message recipient. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

Consistent with embodiments of the invention, some of the many tasks people commonly use a social network service to perform are improved by conveying to a user of the service specific information concerning the associations (e.g., relationships and affiliations) that a user, or an entity on whose behalf the user is acting (e.g., a company, group or other organization with which the user is associated), might share in common with another member of the social network service, while the user is performing a particular task. Specifically, the inventive concepts described herein involve techniques for analyzing a social graph to identify connection paths connecting a user (or, some other entity) with another member of the social network service, and then to present a visual representation of those connection paths that are determined to be the strongest, or best suited for a particular purpose. While social graphs used by many conventional social network services model only the relationships that exist between people, embodiments of the present invention use a social graph that includes not only people, but other types of entities as well. For example, a social graph consistent with some embodiments of the invention may include entity types such as, companies, educational institutions, groups, and so forth. As such, a connection path in the social graph that connects two members may be based on a wide variety of associations between the various entities, including personal relationships between members, a common employment relationship with a particular company, common membership in a group, and so forth.

The algorithmic processes used to identify and present the connection paths connecting a user with a target member are implemented with a combination of hardware (e.g., computer processors and memory) and software (e.g., executable instructions) that is generally referred to herein as a pathfinder module. Furthermore, the inventive concepts that are presented herein are generally applicable to a wide variety and nature of applications and tasks. However, for brevity, the examples of the inventive concepts described herein are primarily presented in the context of two specific types of applications including applications involving electronic or digital messaging or communication systems and techniques, and applications for facilitating browsing and searching of member profiles.

Consistent with some embodiments of the invention, a social network service maintains a social graph, implemented as a graph data structure having nodes and edges, where the nodes represent different entities and the edges represent various associations or relationships between entities. For example, with some embodiments, the entity types may include people, companies, educational institutions (e.g., schools and universities), and groups (e.g., online groups, or professional organizations), among others. Accordingly, the edges that connect any two nodes (entities) represent types of associations between the entities, and will therefore depend in part on the entities involved. For example, an edge connecting two nodes that represent people may be representative of a specific type of relationship between the two people, including a direct, bilateral connection between the two people. An edge connecting a first node, representing a person, with a second node, representing a company, may be representative of an employment relationship (current or previous) between the person and the company. In addition to the edges having a particular type, representative of the nature of the relationship between two entities, each edge connecting two entities is assigned an edge score to reflect the strength, or relevance, of the particular association.

Consistent with some embodiments, when a user is performing a particular task, the social network service (e.g., specifically, the pathfinder module) will perform an algorithmic process to analyze the social graph and to identify the connection paths that connect a user (e.g., the person performing the task) or some entity specified by the user and on whose behalf the user may be acting, with another member of the social network service. The connection path or paths that are determined to be strongest, or most relevant, with respect to the particular task being performed, are then visually presented to the user, providing the user with important contextual information for completing the task. For purposes of the present disclosure, to distinguish the person involved in the performance of a task with those persons who may be subjects of a task, the term "user" is used herein to identify the person who is performing a task, while the terms "target" and/or "target member" are used to identify a subject of the task. Similarly, in the specific context of a digital messaging application, the terms "message sender" and "message recipient" are used herein. While a message recipient is the member to whom a message is addressed, a message sender is the user performing the task of preparing and sending a message on his or her own behalf, or on behalf of an entity, such as a company, group or other organization.

Consistent with some embodiments of the invention, for each connection path connecting a user to a target member, a path score is derived to reflect the overall connection strength (or relevance) of the path connecting the user with the target. For example, with some embodiments, the path score is derived by simply aggregating (e.g., summing, or otherwise combining with an algorithm or formula) the individual edge scores that correspond with the edges connecting the nodes that ultimately connect the user with the target member. As described in greater detail below, a variety of algorithms may be used to derive the individual edge scores for a particular edge and/or edge type connecting any two nodes in the social graph. Similarly, a variety of algorithms may be used to derive the path scores for the connection paths connecting a user with a target. For example, with some embodiments, various weighting factors may be applied to influence (e.g., increase or decrease) the edge score for a particular edge type (e.g., the type of association existing between two nodes in the social graph), based on the particular task for which the connection paths are being identified and presented. In any case, once the various connection paths connecting a user or some user-specified entity to a target member have been identified and ordered or ranked by path score, a visual representation of the connection path having the highest path score is presented to the user. With some embodiments, a visual representation of several independent connection paths may be presented.

In the context of a messaging application, and particularly a web-based messaging application, consistent with some embodiments of the invention, when a message sender has addressed a message to another member of the social network service (e.g., a message recipient), the message sender is presented with a visual representation of the best connection path or paths connecting the message sender to the message recipient, as determined by analysis of the social graph maintained by the social network service. With some embodiments, the algorithm used to derive the path scores for the various connection paths connecting the message sender to the message recipient may be selected based on an inferred type of communication, or an explicitly selected type of communication. For instance, with some embodiments, the social network service may use machine learning techniques and/or various algorithms to infer the type of communication (e.g., the purpose or reason the message sender is communicating with the message recipient), and then based on this information, a particular algorithm for deriving the path scores may be selected. With some embodiments, the message sender may explicitly select or otherwise specify the type of communication, such that the selected communication type will influence the algorithm used to derive the path scores for the connection paths connecting the message sender with the message recipient. By tailoring the algorithm that is used to derive the path scores to a specific task (e.g., sending a message) and/or a specific context for a task (e.g., a type of communication for the task of sending a message), the most relevant connection path(s) can be presented to the user, based on the task and context in which the task is being performed.

With some embodiments, the visual representation of the best connection path or paths (e.g., the connection path or paths with the highest path scores) may be automatically embedded or otherwise included in the content of a message being prepared by the message sender. Consequently, when the message recipient receives the message, the message recipient can view a visual representation of the best connection path or paths connecting the message sender with the message recipient. Alternatively, the connection path or paths may be presented in a manner that allows the message sender to simply reference the relevant information when the message sender is composing the message. For instance, with some embodiments, the visual representation of the connection path may be presented as a separate element of a graphical user interface displayed when the message sender is composing the message. Similarly, the visual representation of the connection path or paths may be presented to a message recipient, not as part of a received electronic message, but instead as part of a separate user interface element that is presented when the message recipient is accessing and viewing the electronic message. In either case, by identifying and then presenting information indicating how the message sender and message recipient are associated or related (e.g., connected via the social graph), the message recipient is more likely to be receptive to receiving, reading, and replying to the message. This is particularly advantageous in an environment where people are frequently overloaded with information and are receiving hundreds of messages per day.

With some embodiments, and specifically in the context of an application that enables users to search for or otherwise browse member profiles, the strongest or most relevant connection path or paths connecting the user with a target member will be presented when the user is viewing the profile of the target member. For example, a user may perform a search of member profiles by specifying various desirable member attributes or characteristics. For instance, a job recruiter may perform a search by specifying one or more member profile characteristics, including: a company at which one is employed, a job title, a college or university attended, and one or more possessed skills. In response to the job recruiter's query, the social network service may present to the job recruiter a list of members having member profile attributes or characteristics that match (partially or fully) the characteristics specified in the query. When the job recruiter selects a particular member from the list, the job recruiter will be presented with the selected member's profile information. In addition, the social network service may present a visual representation of a connection path connecting the job recruiter to the selected member, where the connection path has been selected for having the highest path score of all connection paths connecting the recruiter with the target member. Alternatively, a visual representation of several individual connection paths may be presented. With some embodiments, the connection path or paths may be presented automatically with the profile information of the selected member. Alternatively, with some embodiments, a graphical user interface element (e.g., a button or link) may be provided with the selected member profile, such that when the job recruiter selects or otherwise interacts with the graphical user interface element, the social network service will invoke the algorithmic process for identifying and presenting the connection path having the highest path score.

With some embodiments, the user that is performing a search of member profiles, or otherwise browsing member profiles, may specify as a sort of proxy an alternative entity (e.g., person, company or other organization) to serve as the starting or beginning node for purposes of identifying the connection paths to an identified target member. For instance, if an independent job recruiter has been tasked with filling a job opening for a particular company, the job recruiter may specify that the company be used as the starting node in the social graph of any connection paths to a particular target member. As such, the pathfinder module of the social network service will attempt to identify and present connection paths connecting the specified company with the identified target member. In such a scenario, the nodes forming the connection paths between the company and the target member may include entities of various types, including but not limited to members who are current or past employees of the specified company, other companies that are associated with the specified company, and schools whose graduates are employed by the specified company.

Referring again to a messaging application, consistent with some embodiments a message sender may compose a message intended for multiple message recipients. For instance, a job recruiter may use the social network service to compile a list of target members to contact as potential candidates for a job opening. The job recruiter may then compose a single generic message to be sent to all the target members on the list, without manually personalizing or customizing the content of the message for each individual member specified as a message recipient. In general, the connection paths from the message sender (the recruiter or the company on whose behalf the recruiter is acting) to each message recipient will be different. In this scenario, the pathfinder module of the social network service is automatically invoked once for each individual message recipient. With each invocation, the pathfinder module will attempt to identify connection paths connecting the message sender with an individual message recipient. Upon successfully identifying one or more connection paths, the message content to be communicated to a particular message recipient will automatically be modified to include a description or graphical visualization of one or more of the strongest, or most relevant, connection paths. In this way, the messaging application can perform a mass customization operation to customize or personalize an otherwise general or generic message so that that a customized or personalized instance of the message is communicated to each message recipient. In particular, the customized or personalized message may include a visual representation of a connection path between the message recipient and the message sender, or the message recipient and some entity on behalf of which the message is being communicated. Alternatively, the message may include information identifying one or more entities in the connection path with an indication of how the message sender or the entity on whose behalf the message is being sent and the message recipient are associated. The personalization of the message to provide some social context will increase the relevance of the message to the particular message recipient.

With some embodiments, in addition to presenting the user with a visual representation of the connection path with the highest path score, the actual path score may be presented to the user. The path score may be normalized in some manner for easy comparison with other path scores, thereby giving the user a sense of which connection paths may be best for a particular task. The path score may be conveyed on some arbitrary scale (e.g., a scale of one to five, with one being a low score, and five being a high score), or simply as a raw number. Additionally, the visual representation of the connection path connecting the user with the target member may be presented in an interactive manner, such that additional information about various entities and associations (e.g., relationships and/or affiliations) may be easily obtained by the user, for example, by manipulating a cursor control device or interacting with a touch sensitive display to select or hover over various user interface elements included in the visual representation of the connection path.

With some embodiments, various user interface controls may be presented with the visual representation of the connection path, thereby allowing the user to very quickly navigate or cycle through the many connection paths connecting the user with the target member, or filter and/or sort the connection paths based on various connection path parameters. For example, by selecting a particular button or link associated with a navigation control, the view of the visual representation of the connection path with the highest path score may be replaced with a view of a visual representation of the connection path with the second highest path score. With some embodiments, user interface controls may be presented to enable the user to filter and/or sort connection paths based on certain entities, entity types, edge types and/or any combinations thereof. For instance, a filtering mechanism may allow the user to select for presentation only those connection paths that include a particular type of entity (e.g., a person, a company, a school or university, or a group), or even a particular entity (e.g., all connection paths including a specific entity, such as the person, John Smith, or a specific educational institution, such as Stanford University). Similarly, the filtering mechanism may enable the user to identify a particular entity to be excluded from all connection paths, such that only those connection paths that do not include the selected entity will be presented to the user. With some embodiments, the filtering mechanism may enable the user to specify various requirements concerning the number of nodes in a connection path, such as a maximum, minimum, or exact number of nodes separating the user with the target member. For instance, the user may desire to view a visual representation of all connection paths between the user and a target member, where the number of nodes between the user and the target member is two or less. Accordingly, the pathfinder module will select for presentation only those connection paths satisfying the specified requirements, and will generally present the selected connection paths in an order with the connection path having the highest path score presented first. Additionally, with some embodiments, various controls may allow the user to explicitly select other connection path parameters that influence the algorithm used to derive the path scores for the connection paths. Various embodiments of the inventive subject matter presented herein provide the aforementioned features and advantages, as well as other advantages, which will be readily apparent from the following description of the various figures.

FIG. 1 is a block diagram illustrating various functional components of a social network system 10 with a pathfinder module 16 for use with a wide variety of applications and specifically for identifying, and then presenting, connection paths connecting a user or user-specified entity with a target member of the social network service, consistent with some embodiments of the invention. As shown in FIG. 1, the social network system 10 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 12, which receives requests from various client-computing devices, and communicates appropriate responses to the requesting client devices. For example, the user interface module(s) 12 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including databases 18 for storing data for various entities of the social graph, including member profiles 18, company profiles 20, educational institution profiles 22, as well as information concerning various online or offline groups 24. In addition, the graph data structure is implemented with a graph database 26, which is a particular type of database that uses graph structures with nodes, edges, and properties to represent and store data. Of course, with various alternative embodiments, any number of other entities might be included in the social graph, and as such, various other databases may be used to store data corresponding with other entities.

Consistent with some embodiments, when a person initially registers to become a member of the social network service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the database with reference number 18.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity, which may or may not be included in the social graph. Various other types of relationships that may exist between different entities, and represented in the social graph data 26, are described in connection with FIG. 3.

The social network service may provide a broad range of other applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in database 24. When a member joins a group, his or her membership in the group will be reflected in the social graph data stored in the database with reference number 26. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 26.

The application logic layer includes various application server modules 14, which, in conjunction with the user interface module(s) 12, generates various user interfaces (e.g., web pages) with data retrieved from various data sources in the data layer. With some embodiments, individual application server modules 14 are used to implement the functionality associated with various applications, services and features of the social network service. For instance, a messaging application, such as an email application, an instant messaging application, or some hybrid or variation of the two, may be implemented with one or more application server modules 14. Similarly, a search engine enabling users to search for and browse member profiles may be implemented with one or more application server modules 14. Of course, other applications or services that utilize the pathfinder module 16 may be separately embodied in their own application server modules 14.

In addition to the various application server modules 14, the application logic layer includes the pathfinder module 16. As illustrated in FIG. 1, with some embodiments the pathfinder module 16 is implemented as a service that operates in conjunction with various application server modules 14. For instance, any number of individual application server modules 14 can invoke the functionality of the pathfinder module 16, to include an application server module associated with a messaging application and/or an application server module associated with an application to facilitate the viewing of member profiles. However, with various alternative embodiments, the pathfinder module may be implemented as its own application server module such that it operates as a stand-alone application. With some embodiments, the pathfinder module may include or have an associated publicly available application programming interface (API) that enables third-party applications to invoke the functionality of the pathfinder module.

Generally, the pathfinder module 16 takes as input parameters that, at a minimum, identify two different nodes corresponding with two entities (e.g., two persons, or a person and a company, etc.) in a social graph that is implemented with a graph data structure (e.g., social graph data 26). Using the input parameters, the pathfinder module 16 analyzes the social graph data 26 to identify the connection paths in the social graph that connect the two entities, if any exist. With some embodiments, additional input parameters may be provided to the pathfinder module 16 and used to refine the connection paths selected for potential presentation to the user. These parameters include, for example, filtering criterion to include or exclude connection paths having particular entities, or particular entity types, or specific edge types. Once the set of connection paths satisfying the input parameters has been identified, the pathfinder module 16 derives a path score for each connection path, for example, by aggregating the individual edge scores for the edges that connect the different nodes included in the connection paths. Finally, the pathfinder module provides the information corresponding with the connection paths to the application that invoked the pathfinder module so that a visual representation of one or more connection paths can be presented to the user.

The pathfinder module 16 can be invoked from a wide variety of applications. In the context of a messaging application (e.g., email application, instant messaging application, or some similar application), the pathfinder module 16 may be invoked to provide a message sender with a visual representation of a connection path between the message sender and a person to whom the message sender has addressed a message (e.g., the message recipient). Similarly, the pathfinder module 16 may be invoked to provide a message sender with a visual representation of a connection path connecting an entity on whose behalf the message sender is acting (e.g., company, group, or other organization) with a message recipient. An example of such an embodiment of the invention is illustrated and described in connection with FIGS. 9 through 13. In the context of an application that allows one to browse member profiles, the pathfinder module 16 may be invoked to present to the viewing user a connection path from the user to a target member whose profile is being viewed by the user. An example of such an embodiment of the invention is illustrated and described in connection with FIGS. 14 through 16.

Figure 2:
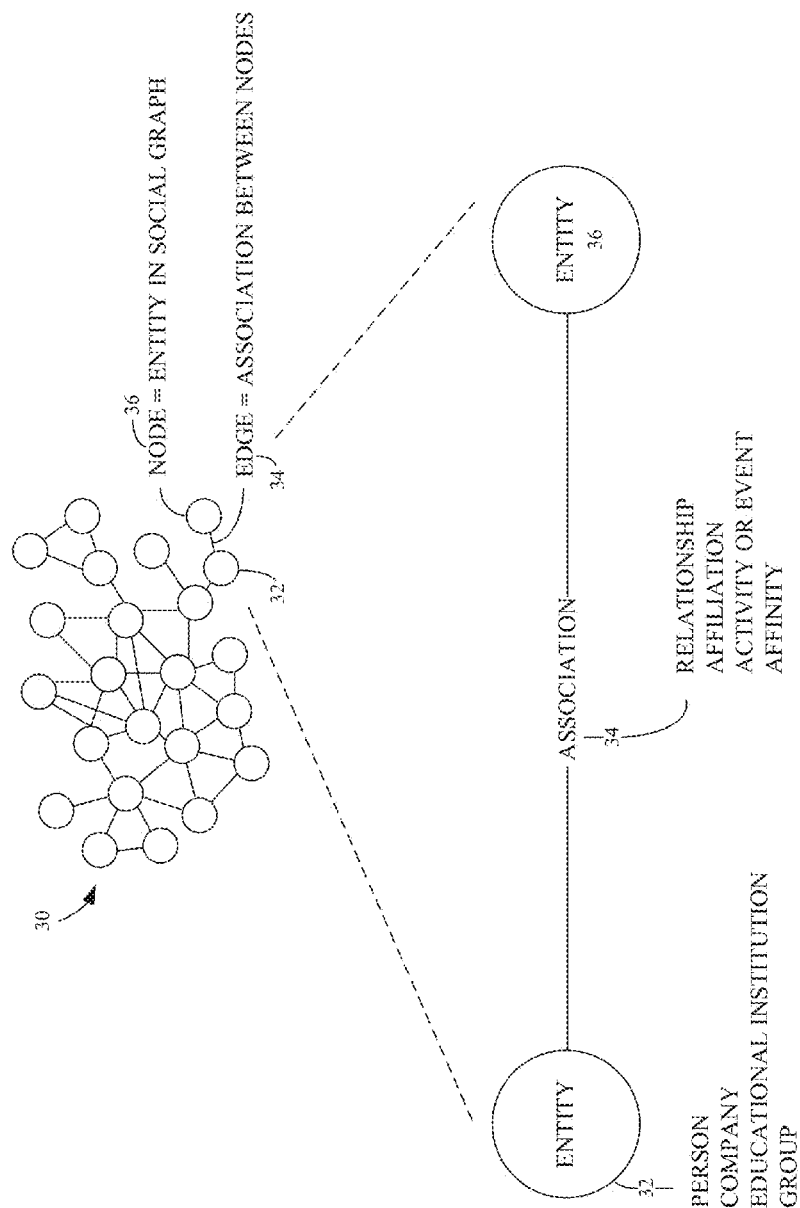
FIG. 2 is a block diagram illustrating an example of a portion of a graph data structure for modelling a social graph, according to some embodiments of the invention.

FIG. 2 is a block diagram illustrating an example of a portion of a graph data structure 30 for implementing a social graph, according to some embodiments of the invention. As illustrated in FIG. 2, the graph data structure 30 consists of nodes connected by edges. For instance, the node with reference number 32 is connected to the node with reference number 36 by means of the edge with reference number 34. Each node in the graph data structure represents an entity in the social graph. With some embodiments, any number of entity types may be included in the social graph. For example, as illustrated in FIG. 2, the entity types that exist in one implementation of a social graph that is consistent with an embodiment of the invention are: a person, a company, an educational institution (e.g., college, school or university), and a group (e.g., an online group, hosted by the social network service, or some other third party server system, or, a real-world organization, such as a professional organization.) The edges that connect any two nodes can represent a wide variety of different associations. For example, in general, an edge may represent a relationship, an affiliation, an activity or event, or some other affinity shared in common between two entities. Although not exhaustive, the various associations presented in the table of FIG. 3 represent some of the many associations that may be mapped to the edges of a social graph data structure to indicate the association between entities in a social graph of a social network service, consistent with some embodiments of the invention.

Figure 3:
FIG. 3 is a table showing examples of the many different types of associations that may be represented with an edge connecting two nodes in a graph data structure, consistent with some embodiments of the invention.

Referring to FIG. 3, the table with reference number 38 illustrates a non-exhaustive list of associations that may be attributed to an edge connecting two nodes, representing entities, in the social graph data structure. Various edge types or associations may be applicable to all combinations of entity types, while others may be applicable to only a certain subset of combinations of entity types. For example, an edge type representing a "following" relationship may connect two nodes, where each node represents a person, and the edge connecting the two nodes indicates that one person is following the other. Similarly, an edge representing a "following" relationship may connect a first node, representing a person, with a second node, representing a company, to indicate that the person is following the company. Accordingly, the edge type for a "following" relationship applies to the entity type, person, as well as company. Some other associations are only meaningful when applied to an edge connecting certain types of entities.

Some of the various associations or edge types shown in FIG. 3 indicate a particular relationship that exists between two entities represented by nodes in the graph data structure. For instance, two members of the social network service may be directly connected, one member may be following another, one member may be in an address book or contacts list of another, two members may be co-managing a group or co-inventors on a patent, and so forth. In each of these examples, the association or edge type is assigned to the edge connecting the two nodes representing the two entities (e.g., person, company, educational institution, group, etc.)

Some of the various associations or edge types shown in FIG. 3 indicate an activity that is shared in common between two entities, or an activity that involves two entities. For example, a first member may have communicated a message to a second member. A first member may have re-tweeted or forwarded some content item (e.g., a tweet) that was originally generated by a second member. A first member may share an item of content with a second member, or, comment on an item of content posted by a second member, and so forth.

A third category of associations generally involves what may be thought of as affiliations. For example, a member may be affiliated with a company based on current or past employment at the company. A member may be affiliated with an educational institution based on current or past attendance as a student. A member may be affiliated with an online group based on membership in the group.

Another general category of associations or edge types involves what are referred to herein as affinities. For instance, two members may be associated based on an affinity or similarity of profile attributes, such as, the same general geographic location, skills shared in common, employment in the same industry, common degrees or majors, etc. The various associations or edge types that may be assigned to an edge connecting two nodes in a graph data structure presented in FIG. 3 are simply some of the many examples. In various alternative embodiments of the invention, different associations (not shown in FIG. 3) may also be used, particularly with embodiments of the invention that have additional entity types other than the specific examples presented herein (e.g., person, company, educational institution, group).

Figure 4:
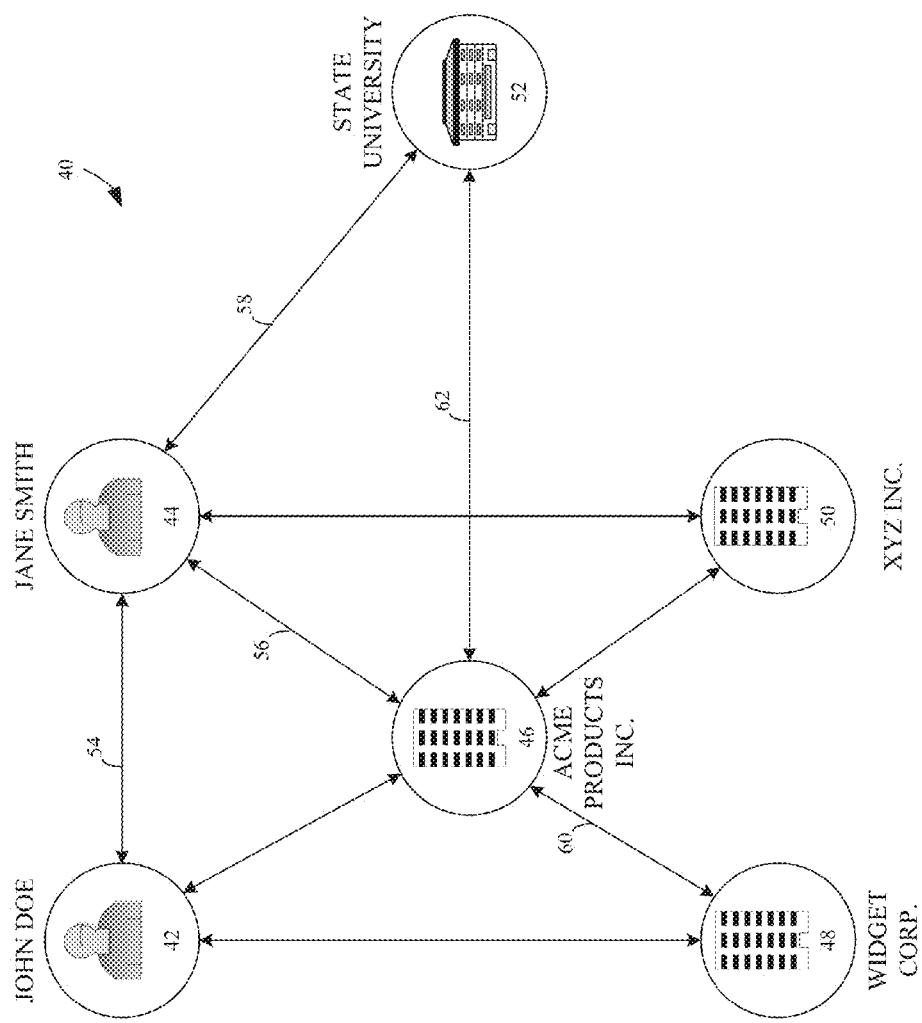
FIG. 4 is a block diagram illustrating an example of a generalized social graph containing nodes of several entity types including members, companies, and schools, consistent with some embodiments of the invention.

FIG. 4 is a diagram illustrating an example of a generalized social graph 40 containing nodes representing several different entities, having varying entity types including members, companies, and schools. Member nodes include John Doe 42 and Jane Smith 44. Company nodes include ACME Products Inc. 46, Widget Corp. 48, and XYZ Inc. 50. There is one school node, State University, with reference number 52. The graph contains edges connecting nodes representing entities of either the same or different types. For example, there is an edge 54 connecting John Doe with Jane Smith, reflecting the fact that John and Jane are directly connected to each other. This edge 54 may be assigned an edge score or weight indicating the strength of the connection between John and Jane. For example, with some embodiments, the weight can be computed using a measure of the overlap between the member connections in John's network and Jane's network. That is, for two members M1 and M2, $W(M1, M2)=Conn(M1, M2)/SQRT[Conn(M1)*Conn(M2)]$ where $W(M1, M2)$ denotes the weight of the edge connecting M1 and M2, $Conn(M1, M2)$ denotes the number of direct member connections that M1 and M2 have in common, $Conn(M1)$ denotes the total number of direct member connections in M1's network, and $Conn(M2)$ denotes the total number of direct member connections in M2's network. Alternatively, the weight for this edge 54 can be determined based on a statistical estimate of the probability that John and Jane know each other, or by other algorithms or techniques or combinations thereof.

Referring again to FIG. 4, there is an edge 56 connecting Jane Smith to ACME Products Inc., which represents Jane's affiliation with ACME Products Inc., as the executive chairman and founder of the company. The score or weight assigned to this edge 56 indicates the strength of this affiliation. For example, with some embodiments, the weight can be computed based on the overlap between Jane's network and the network of ACME Products Inc., where the node in the social graph representing ACME Products Inc. is connected to each member who is a current or former employee of the company. That is, for a member M1 and a company C1, $W(M1, C1)=Conn(M1, C1)/SQRT[(Conn(M1)*Conn(C1)]$ where $W(M1, C1)$ denotes the weight of the edge connecting M1 and C1, $Conn(M1, C1)$ denotes the number of members M1 is connected to who are also current or past employees of C1, $Conn(M1)$ denotes the total number of connections in M1's network, and $Conn(C1)$ denotes the total number of members who are current or past employees of C1. Similarly, there is an edge 58 connecting Jane Smith to State University 52, which represents Jane's affiliation with State University as an alumnus of the university. The weight of this edge indicates the strength of this affiliation. For example, the weight of an edge connecting a member M1 and a school S1 could be computed as $W(M1, S1)=Conn(M1, S1)/Conn(M1)$, where $Conn(M1, S1)$ denotes the number of members M1 is connected to who are also students or alumni of S12, and $Conn(M1)$ denotes the total number of member connections in M1's network.

There is an edge 60 connecting ACME Products Inc., with Widget Corp., which represents the association between the two companies. An association between two companies can exist for a variety of reasons, for example, if they share a common founder, if some members of the social network service have been employed at both companies, if one company is a subsidiary of the other, or if the two companies are business partners. In this particular example, ACME Products Inc. and Widget Corp. are connected because a large number of former Widget Corp. employees are currently employed with ACME Products Inc. The weight of the edge denotes the strength of the association. For example, the weight of an edge connecting two companies C1 and C2 could be computed as $W(C1, C2)=Conn(C1, C2)/SQRT[Conn(C1)*Conn(C2)]$, where $Conn(C1, C2)$ denotes the number of members who have worked at both C1 and C2, and $Conn(C1)$ and $Conn(C2)$ denote the number of members who have worked at C1 and C2 respectively. Similarly, there is an edge 62 connecting ACME Products Inc. with State University, which represents the association between the company and the school. This association can exist for a variety of reasons, for example, if graduates of the school or students at the school are employed by the company. Again, the weight assigned to the edge 62 indicates the strength of the association. For example, the weight of an edge connecting a company C1 with a school S1 could be computed as $W(C1, S1)=Conn(C1, S1)/SQRT[(Conn(C1)*Conn(S1)]$, where $Conn(C1, S1)$ denotes the number of members employed by company C1 who attend or have attended school S1, $Conn(C1)$ denotes the number of members employed by C1, and $Conn(S1)$ denotes the total number of members who attend or have attended S1.

Figure 5:
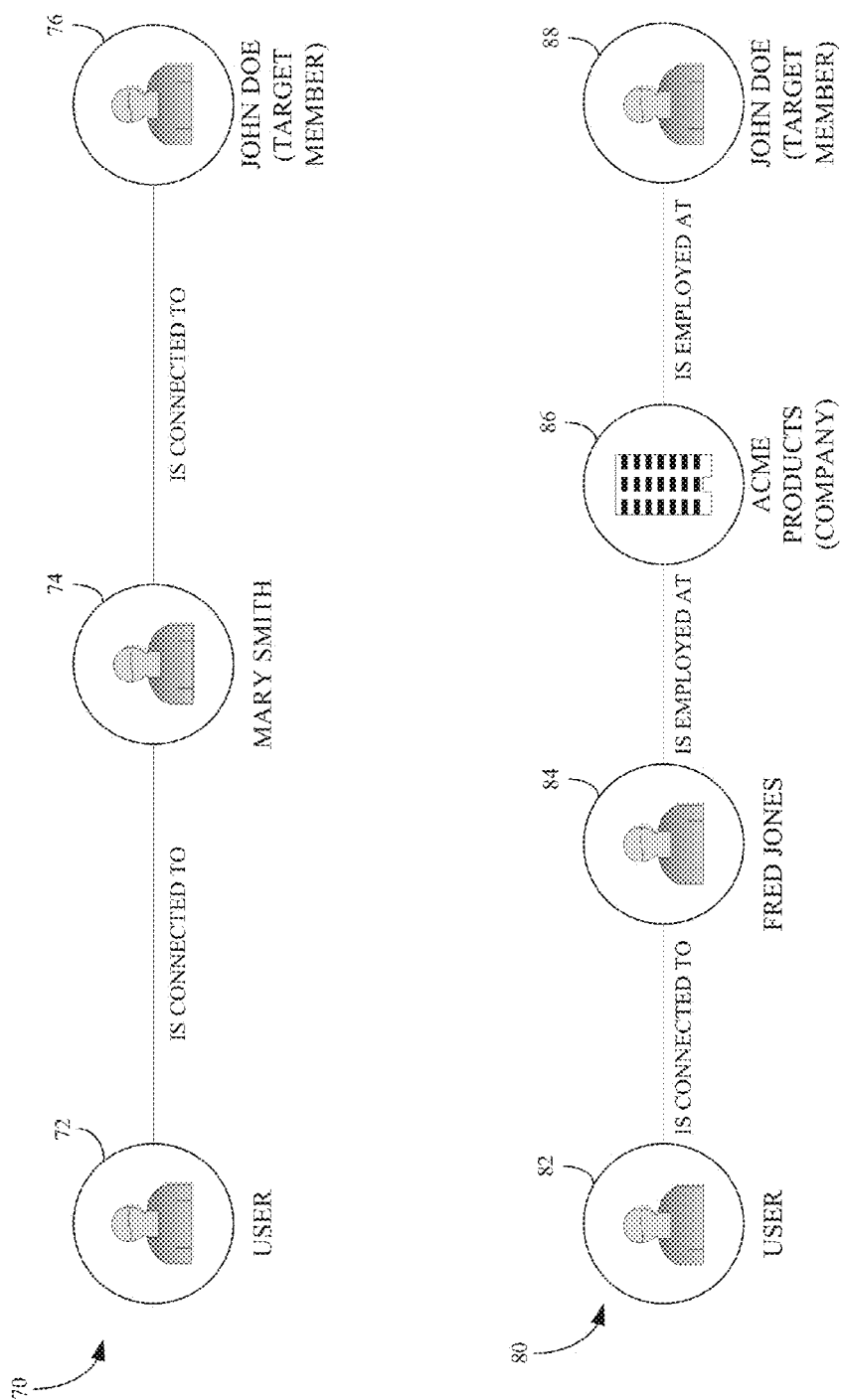
FIG. 5 is a block diagram illustrating some examples of connection paths in a social graph connecting a user with a target member, consistent with embodiments of the invention.

FIG. 5 is a block diagram illustrating some examples of connection paths in a social graph connecting a user with a target member, consistent with embodiments of the invention. As the term is used herein, a "connection path" is simply a nodal path through a graph data structure that connects two specific nodes (entities in a social graph). Referring to FIG. 5, in the example connection path with reference number 70, the user, who is represented by the node with reference number 72, is directly connected to the member, Mary Smith, represented by the node with reference number 74. In turn, Mary Smith is directly connected to the target member, John Doe, represented by the node with reference number 76. In this relatively straightforward and simple example, only a single node 74 separates the user 72 and the target member 76, and only one edge type (i.e., a direct connection) is involved.

In the example connection path with reference number 80, the user, represented by the node with reference number 82, is directly connected to the member, Fred Jones, represented by the node with reference number 84. In turn, Fred Jones is an employee of the same company (e.g., ACME Products Inc., represented by the node with reference number 86) at which the target member, John Doe (node with reference number 88), is employed. Accordingly, this example connection path 80 involves two different node types (e.g., a person and a company), and two different edge types (e.g., a direct connection and an employment relationship).

Given the various associations that may exist between entities, for example, as set forth in the table of FIG. 3, it is readily apparent that in many instances, there may be a significant number of connection paths connecting two persons, or an entity (e.g., a company) with a person, such that one or more of the connection paths may not be obvious or immediately apparent to the user. Furthermore, as these two different example connection paths 70 and 80 make apparent, the entity and edge types or associations involved in a particular connection path will often make one connection path more relevant with respect to a particular task or objective than another connection path. Accordingly, with some embodiments of the invention, after identifying a set of connection paths connecting a user with a target member, or, a user-specified entity with a target member, the pathfinder module will generate a path score for each connection path identified. With some embodiments, the path score for each individual connection path will be dependent upon the individual edge scores assigned to the edges connecting the nodes in the connection path. With some embodiments of the invention, different algorithms may be automatically used to derive path scores for different applications or tasks. The particular algorithm used to derive the path score may be automatically and dynamically selected, for example, based on a determination of what the user is attempting to achieve. Alternatively, with some embodiments, the user may make an explicit selection (e.g., by specifying a type or category of message, or, a purpose for contacting someone), which will then influence the algorithm used to derive the path scores. Consequently, the edge scores or weights for different edge types may be derived differently, for example, to increase or decrease the influence of edge scores of certain types of edges on the path score, depending upon the particular application that has invoked the pathfinder module, or a particular task or process being undertaken or performed.

With some embodiments, the application invoking the pathfinder module may filter the connection paths output by the pathfinder module, or modify the scores or ordering of the connection paths, by using additional methods or algorithms that customize the output of the pathfinder module for the needs of the particular application. For example, an application that identifies intermediate members in a social network who may be able to introduce the user to a target member could adjust the scores of the intermediate members based on data concerning the historical or past activities undertaken by those members within the context of the social network service.

Figure 6:
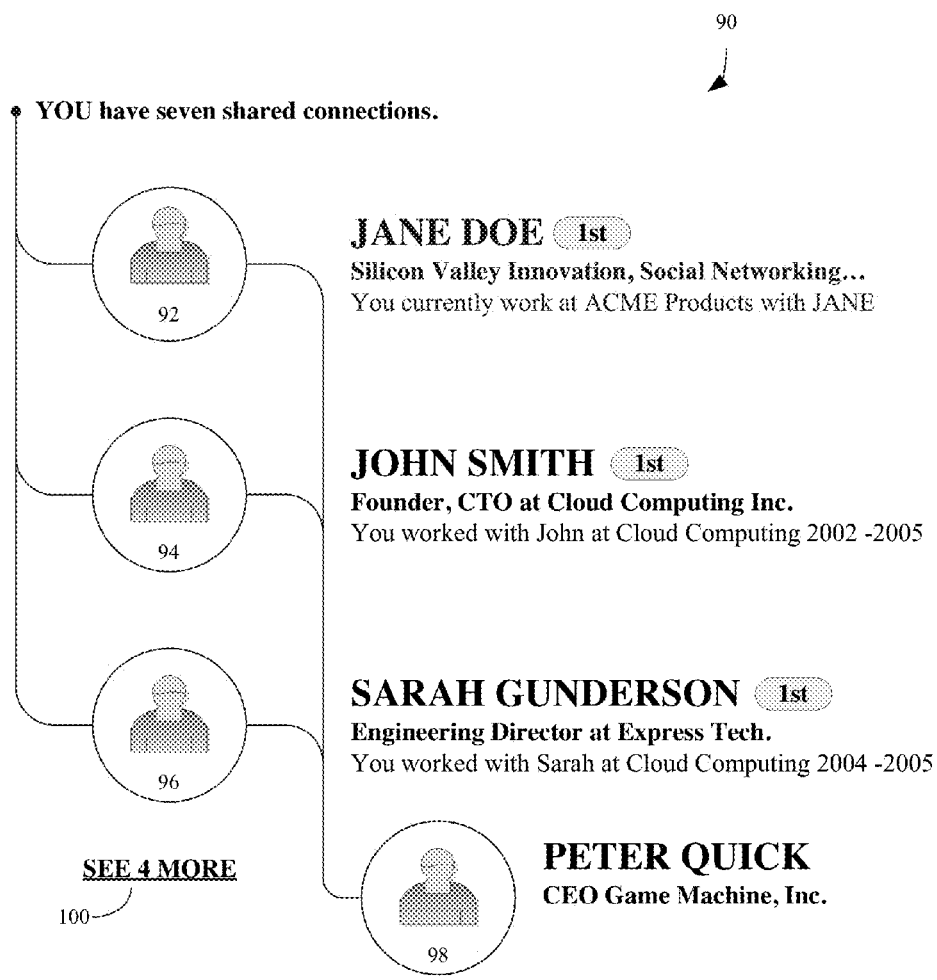
FIGS. 6 through 8 are examples of some user interface elements that convey a visual representation of connection paths in a social graph connecting a user with a target member, consistent with embodiments of the invention.
Figure 7:
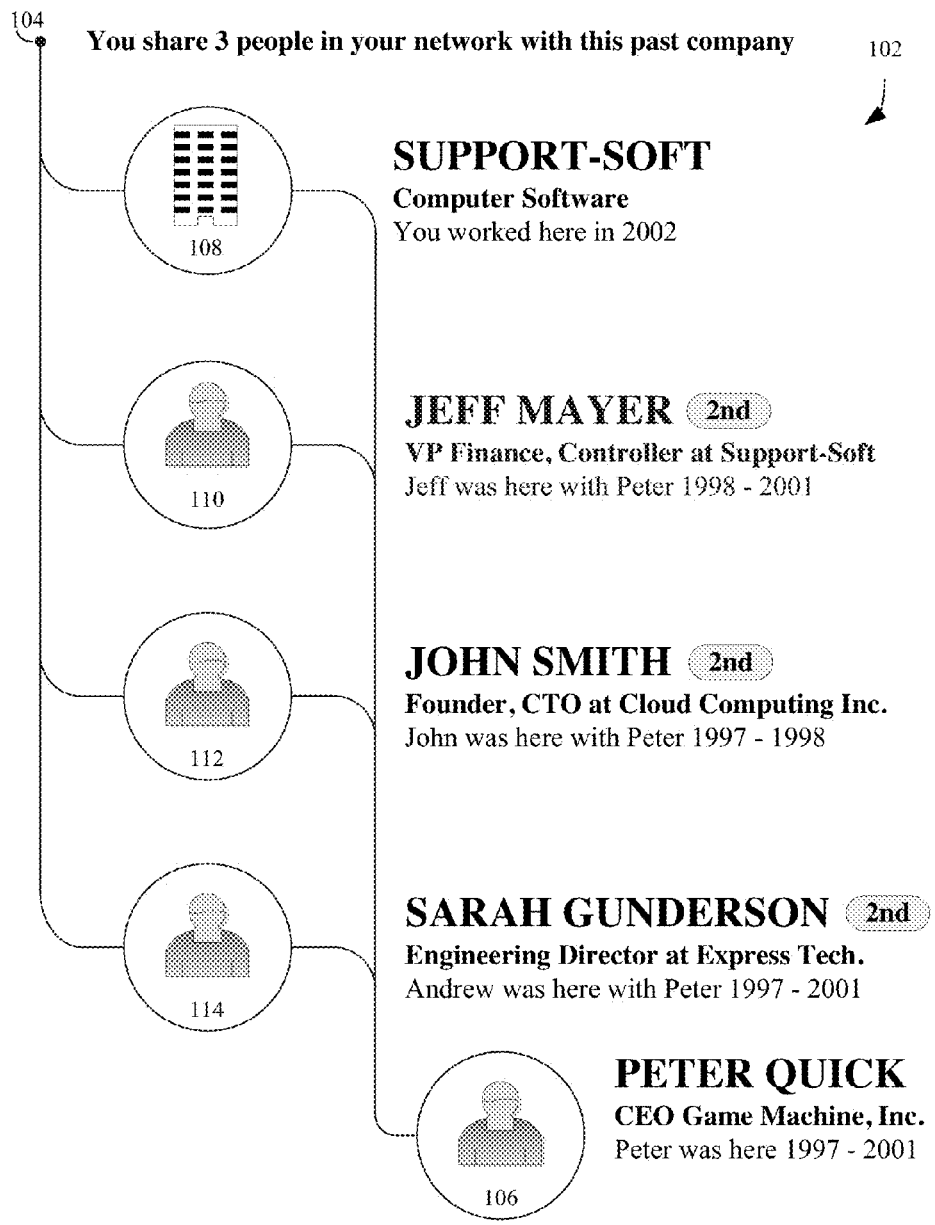
Figure 8:
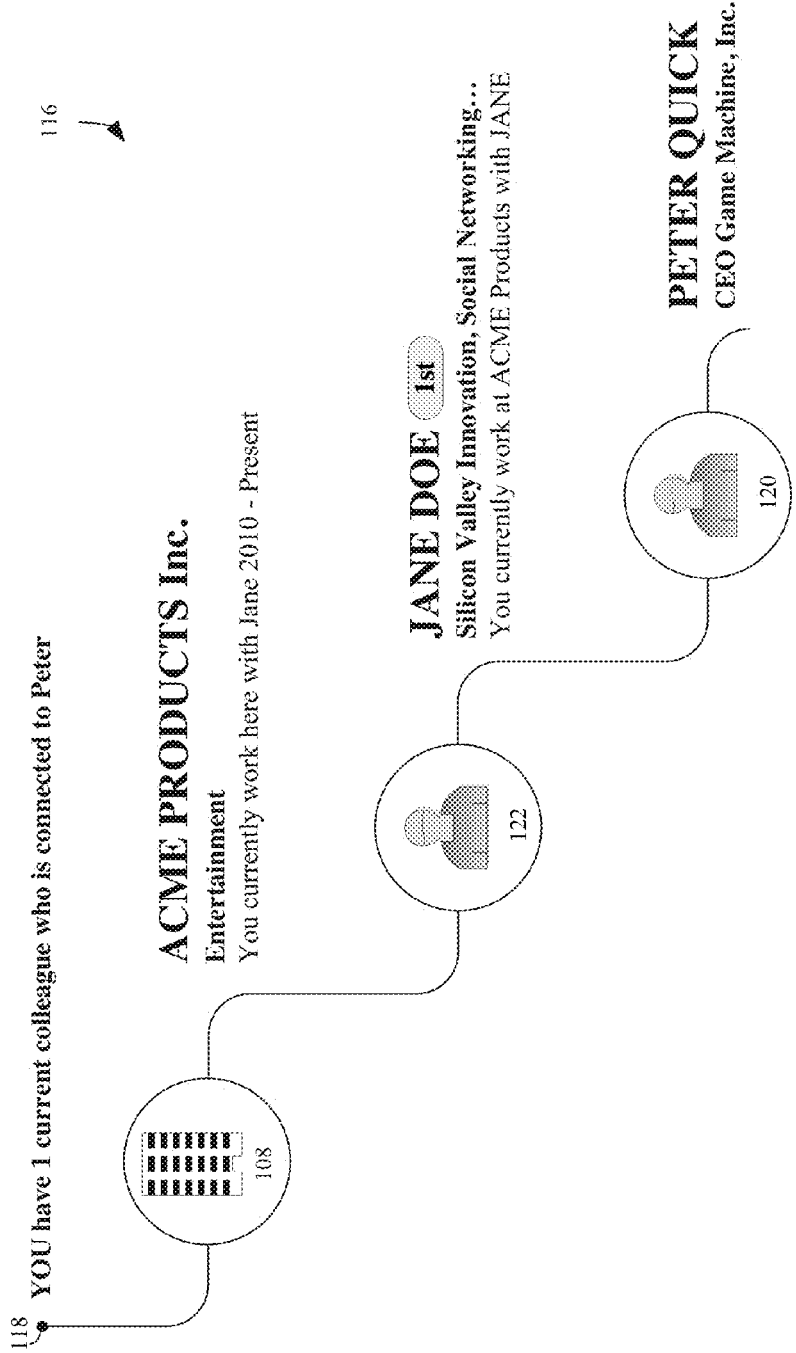

The presentation of the visual representation of the connection path or paths can vary significantly from one application to the next, and from one embodiment of the invention to the next. Without any intent to limit the scope of what is claimed, FIGS. 6 through 8 present various examples of user interfaces that convey a visual representation of connection paths in a social graph connecting a user with a target member, consistent with some embodiments of the invention. These example user interfaces represent user interface elements that might be used in any type of application to present contextual information concerning a connection path between a user and another member of a social network service.

As illustrated in FIG. 6, the example user interface 90 shows a visual representation of three different connection paths having an equal number of nodes (e.g., entities) and the same type of edges (e.g., association). Specifically, in this example, the user represented by "YOU" has seven direct connections (e.g., person-to-person relationships established via the social network service) that are also directly connected to the target member 98. Of those seven connections, three are visually presented in the user interface element while the other four are accessible to the user via the button or link 100 corresponding with the text, "SEE 4 MORE." With some embodiments, when multiple connection paths exist with the same number of nodes and the same edge types, all or a specific subset of the connection paths may be presented in parallel, as shown in FIG. 6. Generally, the order in which the connection paths are presented will be dependent upon the connection strength, as indicated by the path score derived for the various connection paths. For instance, in the example of FIG. 6, the connection path including the node with reference number 92 is presumed to be a stronger, or more relevant, connection path than the connection path including the node with reference number 94.

While the connection paths associated with the user interface element of FIG. 6 involve a direct connection as an edge type, the visual representation of the connection paths corresponding with FIG. 7 involve an employment relationship with a company. Specifically, the user interface element 102 shown in FIG. 7 indicates that the user (represented by the point with reference number 104) has three people in his broader network (e.g., within the social graph) who are connected to the target member and who were at one time or another employed with the same company at which the user and the target member (e.g., Peter Quick, with reference number 106) were at one time employed. In this example, the company (e.g., Support-Soft.) is represented by the user interface element with reference number 108, while the individual members, and thus the separate connection paths, are represented by the user interface elements with reference numbers 110, 112 and 114. In this particular example, as indicated by the textual descriptions positioned next to each user interface element that corresponds with a node from the social graph, the members forming the connection path to the target member 106 are second level, or second degree, connections of the user 104. With some embodiments, the user may interact with the individual user interface elements 110, 112, 114, for example, by manipulating a cursor control device or interacting with a touch sensitive display, to select or hover over a user interface element, causing additional information to be presented. The additional information may include information concerning the various first level, or first degree, connections, who the user 104 shares in common with the members represented by the user interface elements with reference numbers 110, 112, and 114, forming the connection paths with the target member 106, as shown in FIG. 7.

FIG. 8 illustrates a third example of a user interface 116 that includes a visual representation of a connection path, consistent with some embodiments of the invention. As illustrated in FIG. 8, the connection path from the user 118 to the target member 120 involves a current colleague of the user 122, who is directly connected to the target member 120. For example, the user is represented in the connection path by the circle with reference number 118. Both the user and Jane Doe, represented by the user interface element with reference number 122, are currently employed at the company, ACME Products, Inc. 108, and Jane Doe is a direct connection of the target member, Peter Quick 120.

The particular user interfaces shown in FIGS. 6, 7 and 8 are simply examples of how a connection path may be conveyed in accordance with some embodiments of the invention. The particular examples might be used as a portion of a user interface for any number of different applications. Other embodiments of the invention may use visual representations of the connection path that differ from those shown in FIGS. 6, 7 and 8. Specifically, with some embodiments, a visual representation of a connection path may not include any parallel paths, but instead, each individual connection path may be shown as a series of nodes representing different entities. With some embodiments, only a subset of the nodes in a particular connection path may be visually represented. Alternatively, with some embodiments, each and every node in a connection path is included in the visual representation.

Figure 9:
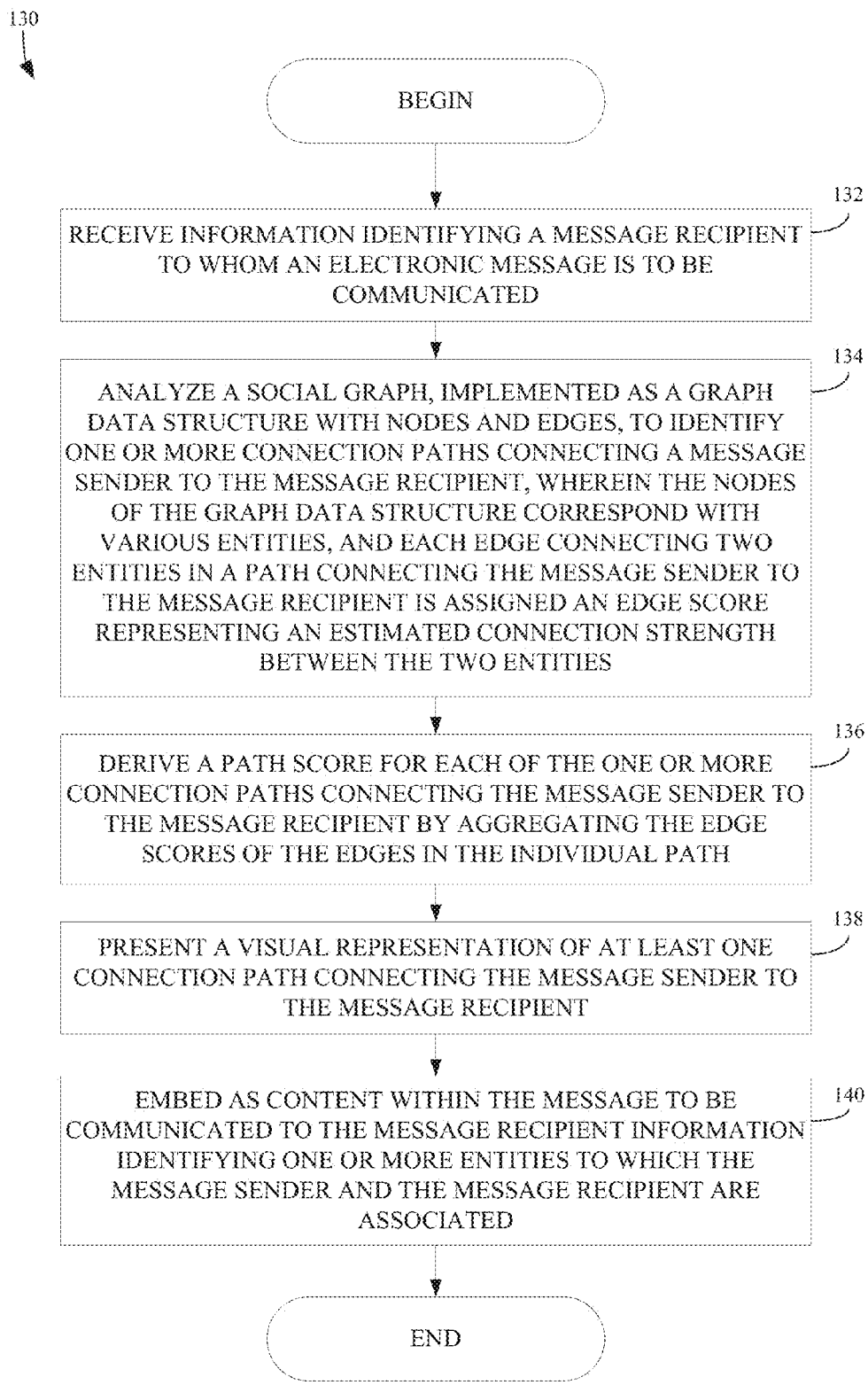
FIG. 9 is a flow diagram illustrating method steps involved in a method for presenting to a message sender a connection path or paths to a message recipient, consistent with some embodiments of the invention.

FIG. 9 is a flow diagram illustrating method operations involved in an example of a method 130 for presenting to a message sender a connection path to a message recipient, consistent with some embodiments of the invention. Consistent with some embodiments, the pathfinder module operates in conjunction with a messaging application to identify, and then present to a message sender, various connection paths connecting the message sender to a person to whom the message sender has addressed a message (e.g., the message recipient). As such, the message sender can leverage the contextual information concerning the connection path or paths by referencing in his or her message select information about an entity (e.g., a person, company, educational institution, group, etc.) that is shared in common with the message recipient.

The inventive subject matter is independent of any specific type of messaging application. For example, the pathfinder module may be used with an email application, an instant messaging (IM) application, a text or SMS (short message service) text messaging application, or even certain telephone or voice communication systems to include any of a variety of voice over IP (VoIP) based services. Similarly, the inventive subject matter can be implemented for use with applications that use any of a variety of network or computing models, to include web-based applications, client-server applications, or even peer-to-peer applications. With some embodiments, the messaging application may be a service that is integrated with the social network service, and thus hosted by the same entity that operates the social network service and the pathfinder service. Alternatively, the pathfinder service may be accessible (e.g., via an application programming interface, or API) to third-party applications that are hosted by entities other than the entity that operates the social network service.

Consistent with some embodiments, the method begins at method operation 132, when the message sender addresses a message to a message recipient, and thus, the messaging application receives information identifying the message recipient to whom the electronic message is to be communicated. With some embodiments, upon receiving the information identifying the message recipient, the message application will invoke the pathfinder module by communicating a request to the pathfinder module. Generally, this request will include information identifying the message sender and the message recipient. However, in some scenarios, particularly when the message sender is acting on behalf of some other entity (e.g., such as when a recruiter is acting on behalf of a company), the pathfinder module may receive an entity associated with the message sender (e.g., a company), and a target member to whom the electronic message is being communicated. In such scenarios, the associated entity may either be manually selected by the user or automatically selected by the application. For example, if a third party recruiter is acting on behalf of a company, the recruiter may select the appropriate company from a list of companies the recruiter is working with. Alternatively, if a recruiter is working exclusively for a specific company, the application may automatically select that company as the associated entity.

Next, at method operation 134, the pathfinder module will analyze the social graph in use by the social network service to identify one or more connection paths connecting the message sender, or the entity on whose behalf the message sender is acting, with the message recipient. With some embodiments, the social graph is implemented with a graph data structure having nodes and edges, where the nodes represent various entities, and the edges connecting two nodes represent the association between the entities. Moreover, with some embodiments, each edge connecting two nodes or entities in a particular connection path is assigned an edge score representing a measure of the strength of connection, or a measure of relevance, between the two nodes or entities.

At method operation 136, the pathfinder module derives a path score for each of the one or more connection paths connecting the message sender, or the entity on whose behalf the message sender is acting, with the message recipient. With some embodiments, deriving the path score involves first identifying or determining an appropriate algorithm or process for use in deriving the path scores. For example, with some embodiments, the specific algorithm or process used to derive a path score for a connection path will be dependent upon various factors, such as the specific application that has invoked the pathfinder module, or, the particular task being performed by the user of the application that has invoked the pathfinder module. In any case, after the proper algorithm or process has been selected, a path score for each connection path connecting the message recipient to the message sender or associated entity is derived. Generally, deriving the path score for a particular connection path involves aggregating or combining in some manner the individual edge scores assigned to the individual edges that form the connection path. The selected algorithm or process may apply various weighting factors to different edge types to influence (e.g., increase, or decrease) the impact that a particular edge type has on a path score.

Next, at method operation 138, a visual representation of at least one connection path connecting the message sender, or associated entity, to the message recipient is presented. In some instances, the connection path with the highest path score is presented. Alternatively, multiple connection paths may be presented. For example, in some instances, the visual representation may show multiple connection paths having the same edge types in parallel with one another, such as the examples illustrated in FIGS. 6 and 7. With some embodiments, the visual representation of the connection path may be automatically embedded within the content of the electronic message. Alternatively, and as shown at method operation 140, a portion of automatically generated text may be embedded or otherwise included within a text box where the message sender composes the message to be sent to the message recipient. Accordingly, the message sender can easily edit the automatically embedded text, as desired, prior to communicating the message to the message recipient.

With some embodiments, the messaging application can customize or personalize a generic message for communication to multiple message recipients. For example, a message sender may prepare a generic message, or select a particular template or pre-drafted message from a set of such pre-drafted messages. Next, the message sender may address the electronic message to two or more members of the social network service. Once the message recipients are identified, the pathfinder module is invoked to identify connection paths from the message sender, or an entity associated with the message sender, to each of the message recipients. Finally, the generic message is then modified by including in each particular instance of a message some contextual information generated by the pathfinder module and showing how the message sender or entity and the particular message recipient are associated. As such, each instance of the message is customized or personalized for the intended message recipient.

Figure 10:
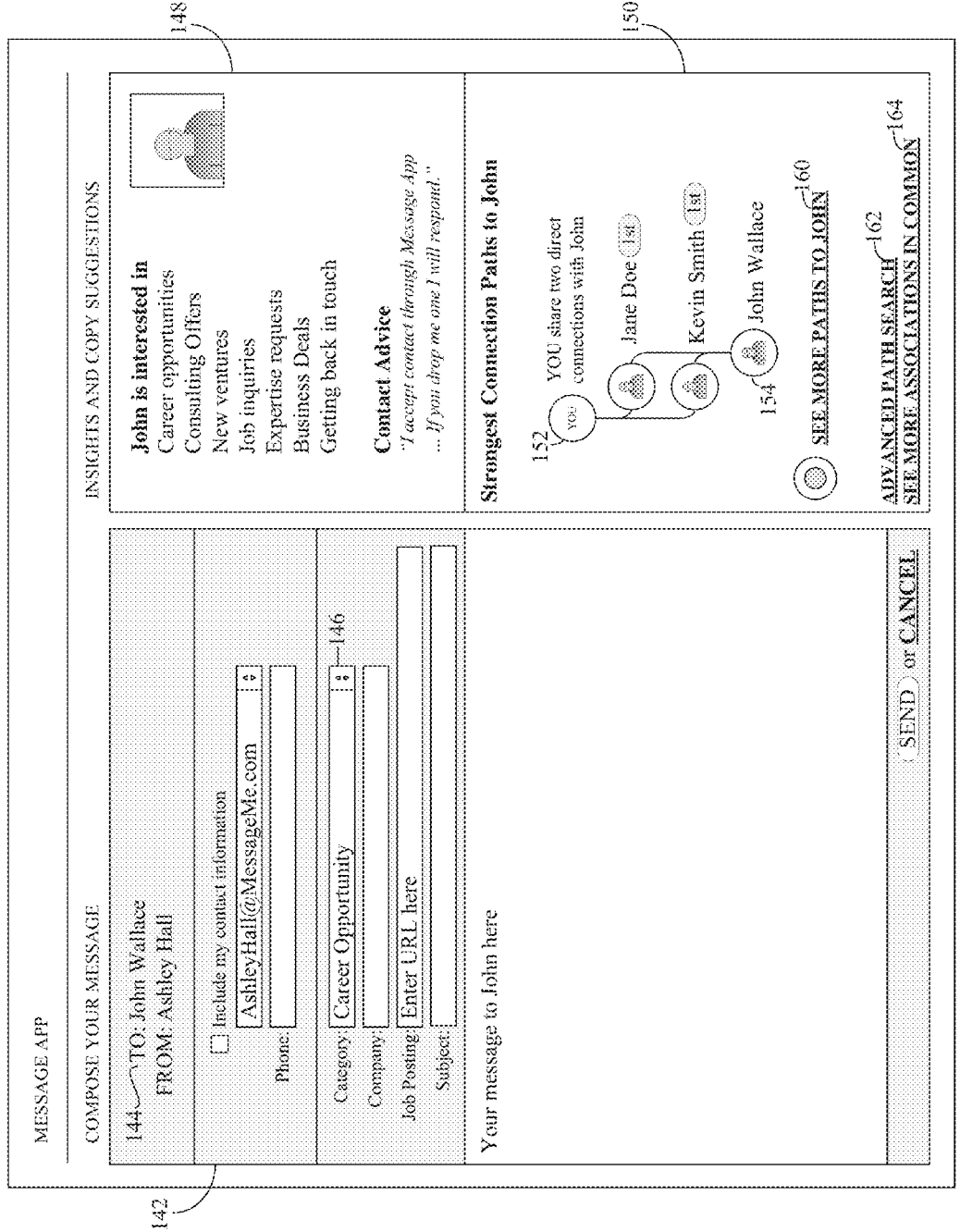
Figure 11:
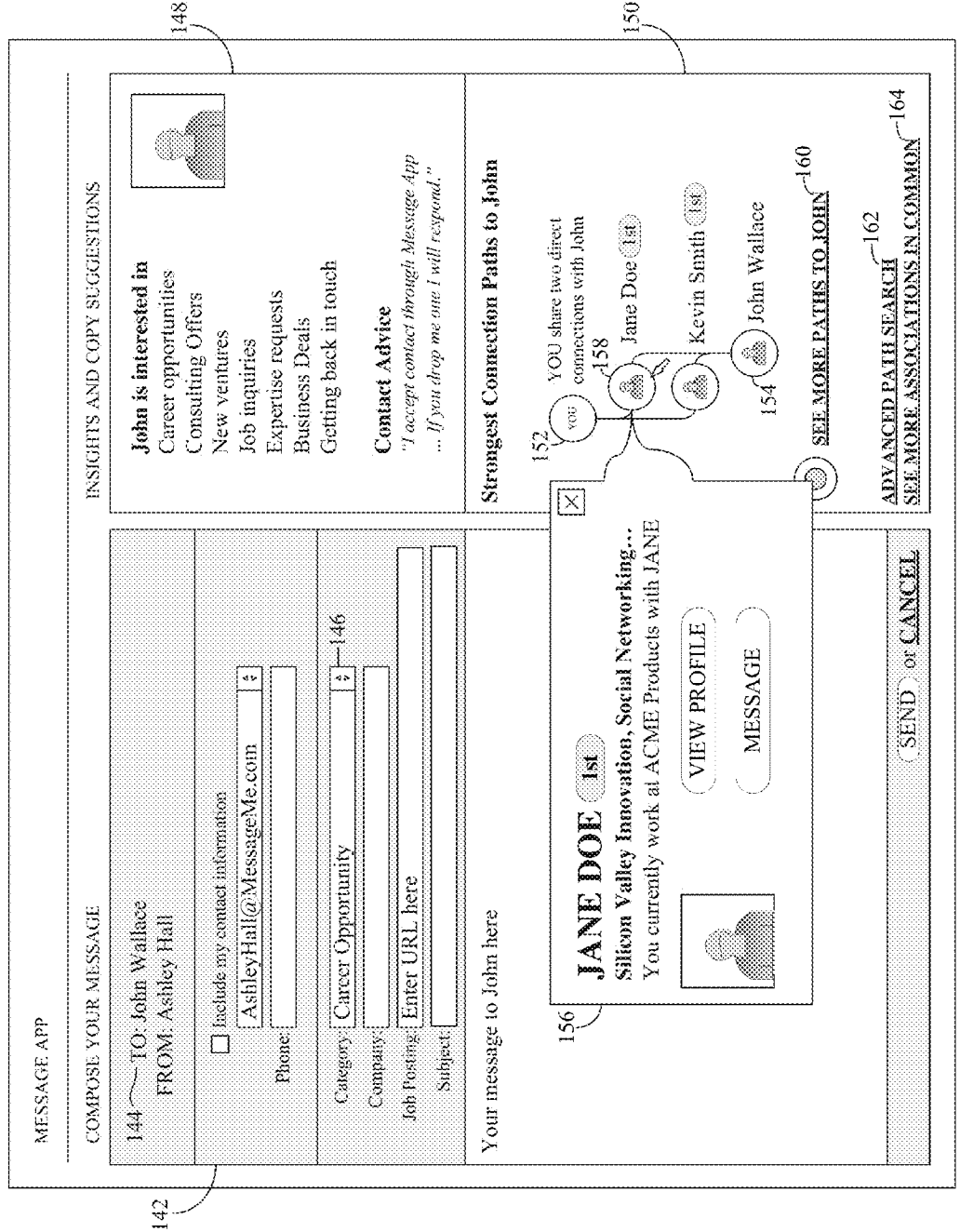

FIGS. 10 through 12 are examples of user interfaces for use with a messaging application that implements a method (such as that described in connection with FIG. 9), consistent with some embodiments of the invention. In the example user interface of FIG. 10, the window pane with reference number 142 includes a text input box 144 for specifying the identity (e.g., name, email address, phone number, etc.) of a person to whom a message is to be communicated. In addition, various other user interface elements for inputting or providing information are presented. Specifically, the drop down box with reference number 146 enables the message sender to specify a category of message that is to be communicated to the message recipient. With some embodiments, the category of message selected by the message sender will influence the algorithm used to derive path scores for the different connection paths that connect the message sender to the message recipient. Upon specifying the identity of the message recipient, and optionally the category of message, the messaging application presents information about the message recipient, for example, as shown in the window pane with reference number 148. In addition, the pathfinder module identifies the strongest connection paths between the message sender and the message recipient, and presents a visual representation of the strongest connection paths. For example, the window pane with reference number 150 includes a visual representation of the strongest connection paths—that is, the connection paths with the highest path scores—connecting the message sender, Ashley Hall 152, with the message recipient, John Wallace 154, via two mutual connections, Jane Doe and Kevin Smith.

With some embodiments, the selection of the message category (e.g., via the drop down box with reference number 146) determines the particular algorithm, formula or process that is used to derive the path score for the various connection paths connecting the message sender to the message recipient. For example, if the message sender indicates that the message category is related to a career opportunity, some connection paths may be determined to be more important than others. For instance, those connection paths that include current colleagues of the message recipient may not be as relevant if the message sender is attempting to recruit the message recipient and persuade the message recipient to leave his current place of employment.

With some embodiments, the visual representation of the connection path is presented in an interactive manner, such that, when the message sender interacts with various user interface elements (e.g., by manipulating a cursor control device, or interacting with a touch sensitive display), additional information may be presented to the message sender. In particular, with some embodiments, additional information about a particular entity in the connection path may be presented. In the example user interface of FIG. 11, the content box with reference number 156 is presented in response to the message sender interacting with the user interface element with reference number 158, which represents an entity (e.g., a person) that is a direct connection of the message sender.

Referring again to FIG. 10, in addition to showing the strongest connection paths in the windows pane with reference number 150, a button or link with the text "SEE MORE PATHS TO JOHN" 160 is shown. With some embodiments, when this button or link 160 is selected, an additional connection path is presented in the window pane with reference number 150. For instance, with some embodiments, selection of the button or link with reference number 160 will cause the connection path with the next highest path score to be presented, thereby allowing the message recipient to cycle through the various connection paths connecting the message sender with the message recipient in order of their respective path scores.

Figure 16:
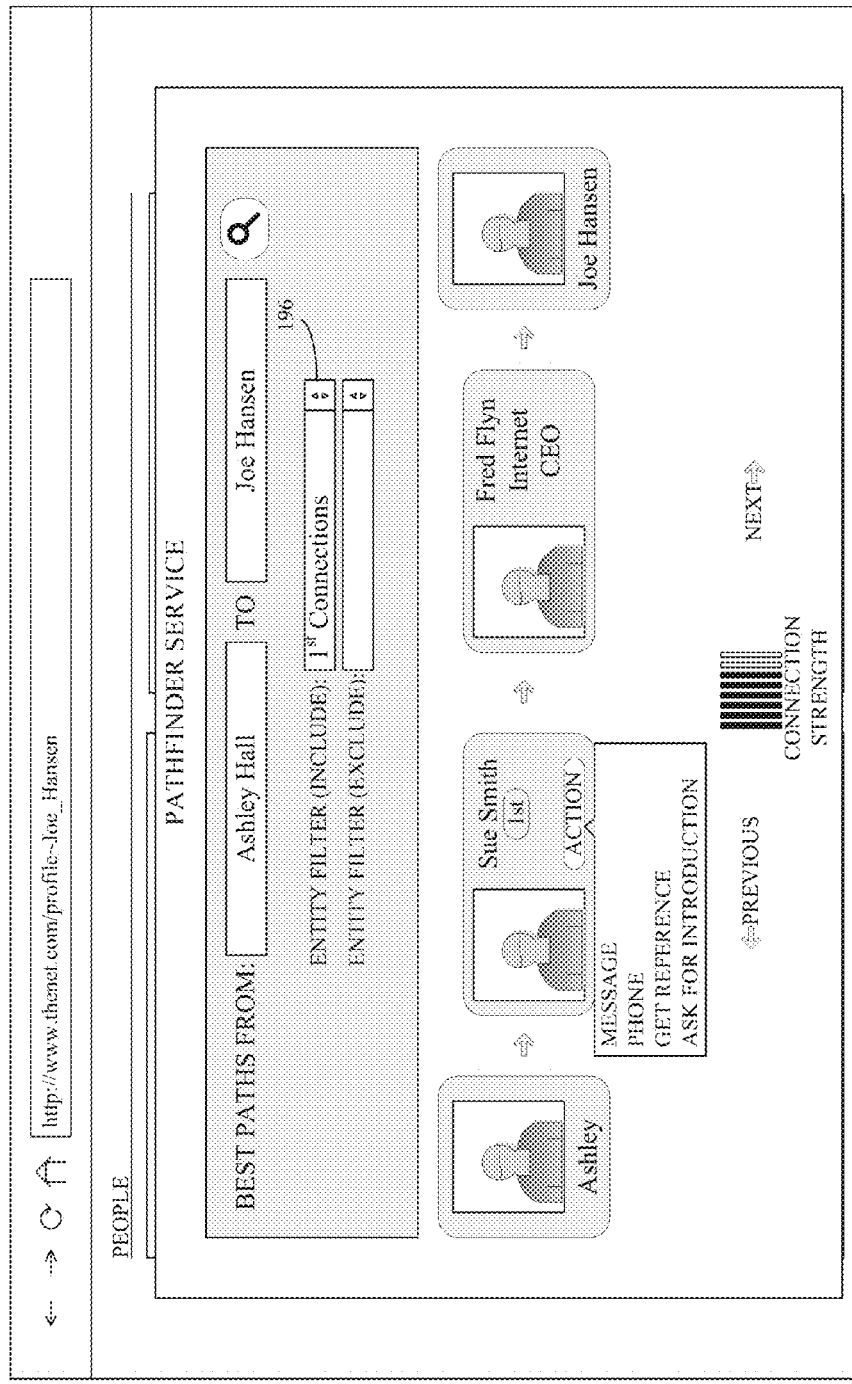
FIG. 16 is an example of a user interface for use with a standalone pathfinder application or service, which may be invoked from a wide variety of other applications, consistent with some embodiments of the invention.

With some embodiments, a button or link 162 may be selected to invoke a separate pathfinder application or service, which enables the message sender to view different connection paths connecting the message sender to the message recipient, and to filter the connection paths by entity, entity type, edge type, or any combinations thereof. For instance, with some embodiments, selecting the button or link with reference number 162 may cause a separate user interface to be presented in an overlay, allowing the message recipient to more fully explore and interact with the pathfinder module by selecting various filtering criteria, and so forth. One example of a user interface of this type is shown in FIG. 16.

Referring again to FIG. 10, with some embodiments, in addition to the visual representation of the strongest, or most relevant, connection paths, the window pane with reference number 150 includes a button or link 164, which, when selected, will cause additional information concerning other associations or affiliations shared in common between the message sender and message recipient to be presented. For example, with some embodiments, when the user selects the button or link with reference number 164 (in FIG. 10), the content presented in the window pane with reference number 150 is changed to show the strongest associations in common—which could include various entities that the message sender and message recipient are both associated with, as well as various attributes that the message sender shares in common with the message recipient—as illustrated in the window pane with reference number 166 in the example user interface of FIG. 12. With some other embodiments, a visual representation of the strongest associations in common may be automatically presented for the use of the message sender in composing the message, instead of the visual representation of the strongest connection paths. A Web-based messaging application may also present either visual representation, or both representations, to the message recipient when an electronic message is received. Either visual representation, or both representations, may also be included in the content of an electronic message communicated to the message recipient. With some embodiments, a visual representation of the strongest associations shared in common between an entity on whose behalf the message sender is acting and the message recipient may be presented to the message sender and/or the message recipient.

Referring now to FIG. 12, the window pane with reference 148 includes various items of information from the message recipient's profile. Specifically, with some embodiments, members of the social network service may specify various interests, specifically, with respect to meeting and connecting with other members of the social network service. For example, a member may specify that he or she is interested in meeting others for the purpose of learning about new jobs or career opportunities, new consulting arrangements, new business ventures, and so forth. Accordingly, when the message sender selects a particular area of interest from the window pane with reference number 148 (as illustrated in FIG. 12), an automatically generated portion of text is presented, as shown in the example content box 168. Specifically, a template or sample message is presented, allowing the message sender to use the template as a draft message, which the message sender can then edit and revise as desired. Accordingly, with some embodiments, the message may be tailored to the specific interest that has been selected by the message sender, and/or to the message category selected by the message sender. With some embodiments, the draft message will include information indicating how the message sender and the message recipient are connected, as determined by the pathfinder module analyzing the social graph of the social network service.

Figure 13:
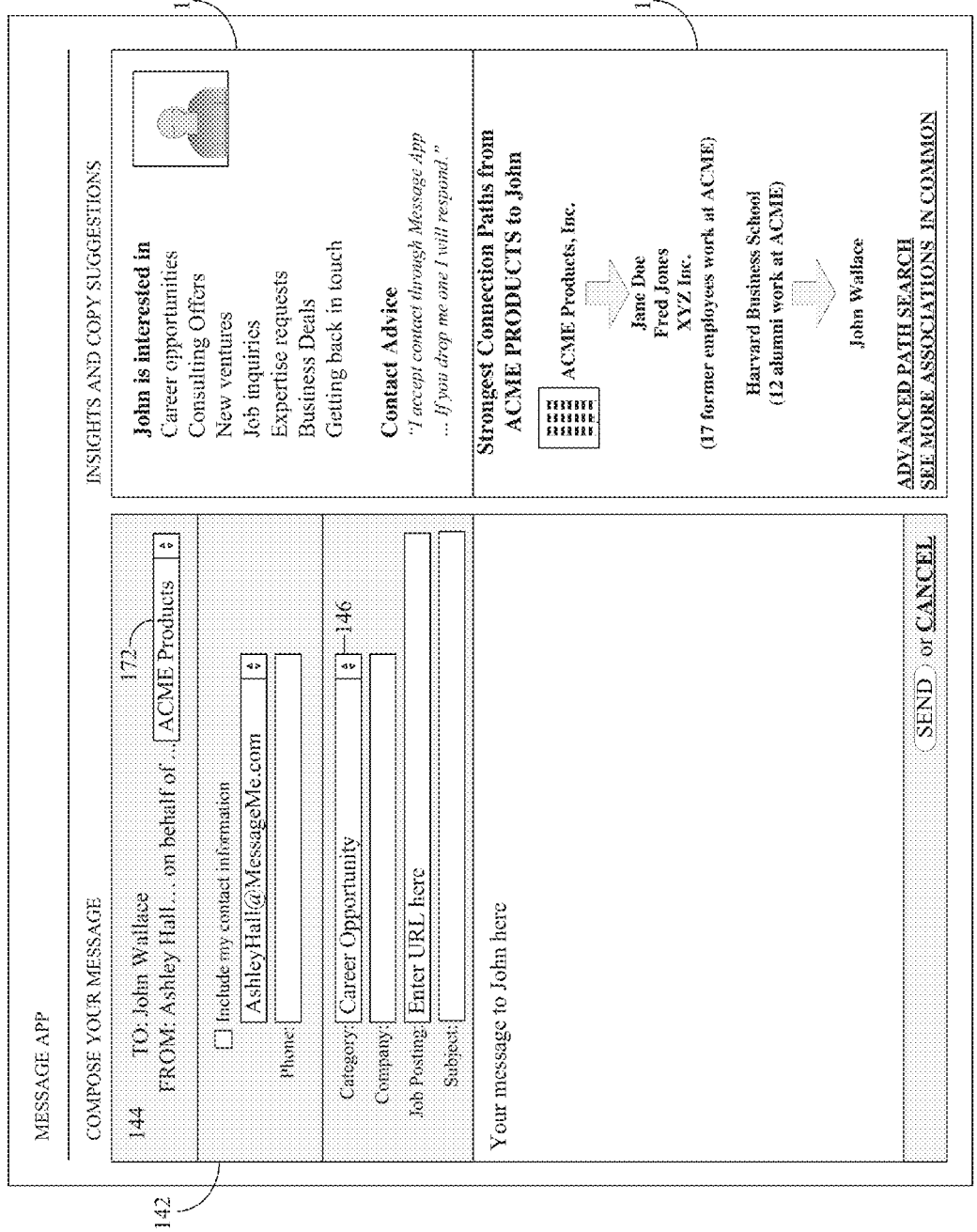

With some embodiments, the message sender may be acting on behalf of another entity. For instance, the message sender may be a recruiter who is recruiting candidates for a job opening at a particular company. Accordingly, with some embodiments, the message sender may select an entity on whose behalf a message is being communicated. The pathfinder module will then identify connection paths connecting the user-selected entity with the message recipient. FIG. 13 is an example of a user interface for a messaging application with a window pane 170 showing several connection paths connecting a user-selected entity (e.g., the company, ACME PRODUCTS) with the message recipient (e.g., John Wallace). In this example, the message sender has selected or otherwise provided the name of the entity on whose behalf the message sender is acting—in this case, by selecting ACME Products from the selection box with reference number 172. Accordingly, the pathfinder module has identified various connection paths connecting the user-selected company with the message recipient and presented a visual representation of those connection paths in the window pane with reference number 170.

Figure 14:
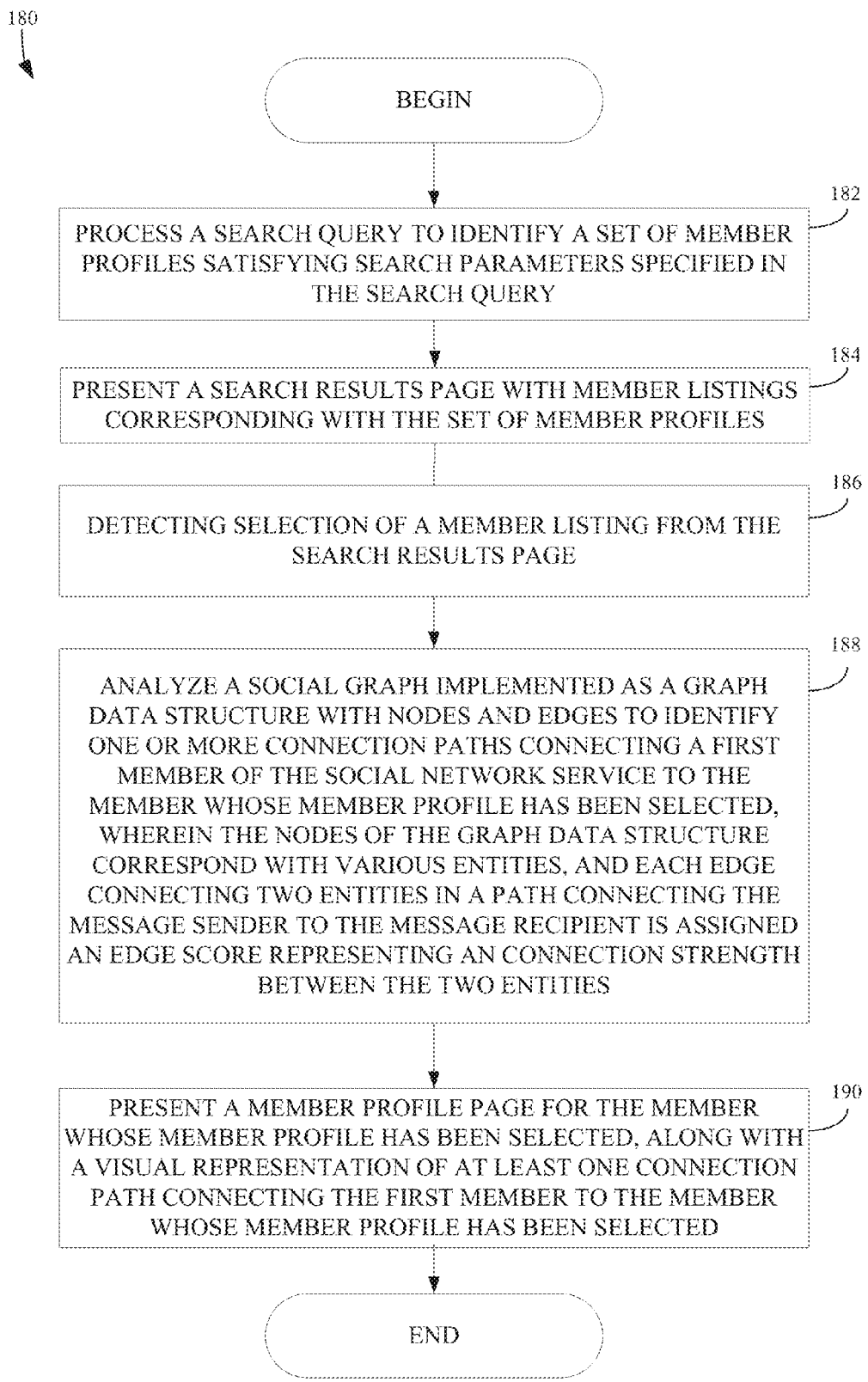
FIG. 14 is a flow diagram illustrating method operations involved in a method of presenting to a user one or more connection paths connecting the user with a target member of a social network in conjunction with an application for searching for and/or browsing member profiles, according to some embodiments of the invention.

FIG. 14 is a flow diagram illustrating the method operations involved in an example method 180 of presenting to a user one or more connection paths connecting the user with a target member of a social network service, in conjunction with an application for searching for and/or browsing member profiles, according to some embodiments of the invention. As illustrated in FIG. 14, the method begins at method operation 182 when a user submits a search query to a social network service, and the social network service processes the search query to identify a set of member profiles with member attributes and characteristics satisfying the search parameters set forth in the search query. For example, if a job recruiter is attempting to identify potential candidates for a job opening, the job recruiter may specify a geographical area where the job opening is located, a particular skill or set of skills, a level of education, or even a specific academic institution, and so forth. In response to receiving the search query, the social network service processes the query to identify those member profiles having the various profile attributes that satisfy some or all of the search parameters specified in the search query.

Next, at method operation 184, the social network service presents a set of member listings. As used herein, a member listing is a short or summary version of a member's profile showing, for example, the member's name, and perhaps some other relevant information such as the member's geographical location, job title, or the industry in which the member is employed. At method operation 186, the social network service detects selection of a member listing in the search results. For example, the viewing user may select, with a cursor control device or by interacting with a touch screen display, a particular member listing from the search results. Selection of the member listing invokes a request for the corresponding member profile.

Accordingly, at method operation 188, the social network service (specifically, the pathfinder module) analyzes a social graph maintained by the social network service to identify one or more connection paths connecting the requesting user with the member whose member profile has been selected. Finally, at method operation 190, the social network service presents to the user a member profile page for the selected member listing. The member profile page includes a visual representation of a connection path connecting the user with the member whose profile is presented. With some embodiments, the particular connection path or paths that are presented are those with the highest path scores.

Figure 15:
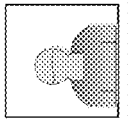
FIG. 15 is an example of a user interface for use with a member profile browsing application that implements a method (such as that described in connection with FIG. 14), consistent with some embodiments of the invention.

FIG. 15 illustrates an example of a user interface for use with a member profile browsing application that implements a method (such as that described in connection with FIG. 14), consistent with some embodiments of the invention. In this example, a member's profile page is presented. Along with the various profile attributes shown in the window pane with reference number 192, a separate window pane 194 shows a visual representation of the strongest connection paths connecting the viewing user with the member whose profile is being presented.

FIG. 16 illustrates an example of a user interface for use with a standalone pathfinder service, according to some embodiments of the invention. With some embodiments, while a user is viewing member profiles, or, composing a message in a messaging application, the user may select a button or link to invoke an interactive pathfinder service that enables the user to explore various connection paths connecting the user to different members of the social network service. As such, the interactive pathfinder application or service may be invoked from within a wide variety of applications, or may be invoked as a standalone application, independent of any other application. By way of example, the buttons or links with reference number 162 (in FIG. 10) and with reference number 196 (in FIG. 15), are just two examples of buttons or links that may invoke the pathfinder application or service from within another application.

With some embodiments, the pathfinder service may enable a user to specify or select a first entity and a second entity. For instance, in the example user interface of FIG. 16, a user has selected the person (entity) "Ashley Hall" as a beginning point or node, and the person, "Joe Hansen", as the ending point or node. In addition, with some embodiments, the pathfinder service will enable the user to specify additional path finding parameters. For example, a user may select a particular entity type (e.g., a person, a company, a group, etc.) that either should be included in a connection path, or should not be included in a connection path. Similarly, a user may select or otherwise specify a particular type of association (e.g., an edge type) that should, or should not, be included in a connection path. Accordingly, when the pathfinder module is identifying connection paths, the user-specified parameters will be taken into consideration in identifying the relevant connection paths. In the example user interface of FIG. 16, the user has selected to identify only those connection paths that include "$1^{st}$ Connections" as indicated in the text box with reference number 196.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 17:
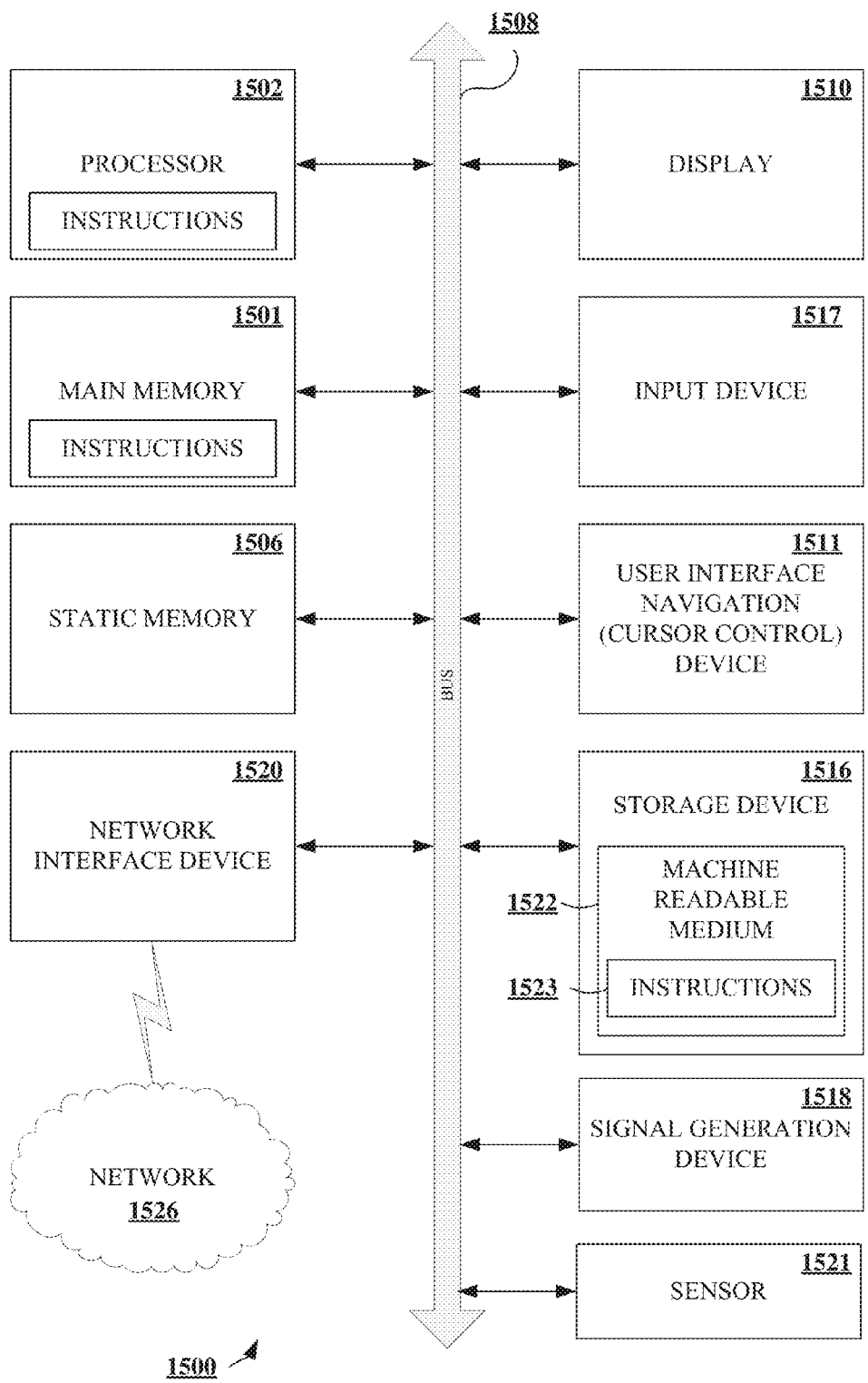
FIG. 17 is a block diagram of a machine in the form of a computing device within which a set of instructions, for causing the machine to perform any one or more of the methodologies discussed herein, may be executed.

FIG. 17 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
using a computer processor:
receiving information identifying a plurality of message recipients to whom electronic messages are to be communicated;
analyzing a social graph to identify a plurality of connection paths, each connection path connecting a first node representing a first entity associated with a message sender with a second node representing at least one of the message recipients selected from the plurality of message recipients specified by the message sender, the social graph represented by a graph data structure having nodes representing various entities and edges representing associations between entities, each edge connecting two nodes included in a connection path assigned an edge score representing an estimated strength of connection between two entities represented by the two nodes, wherein the estimated strength of connection is determined according to a shared number of nodes in the social graph that the first node and the second node have in common based on an edge type connecting the shared number of nodes with the first node and the second node;
deriving a path score for at least, one connection path of the plurality of connection paths by aggregating edge scores of the edges in the at least one connection path;
applying one or more user-specified filter criterion to one or more connection paths of the plurality of connection paths to filter the one or more connection paths, the one or more filter criterion comprising at least one of: a particular entity, a particular entity type, or a specific edge type;
generating a visual representation of at least one of the one or more filtered connection paths satisfying the applied one or more filter criterion, the at least one of the one or more filtered connection paths connecting the first node representing the first entity with the second node;

generating a plurality of customized instances of an electronic message by automatically modifying a generic electronic message to include information identifying entities represented by the shared number of nodes for at least one connection path of the plurality of connection paths; and presenting the visual representation of at least one connection path selected from the plurality of connection paths within at least one generated customized instance of the electronic message addressed to at least one message recipient selected from the plurality of message recipients.

2. The method of claim 1, wherein the first entity is specified by the message sender.

3. The method of claim 1, wherein the first entity is automatically selected by an application.

4. The method of claim 3, wherein the message sender is selected as the first entity.

5. The method of claim 3, wherein an entity on whose behalf the message sender is acting is selected as the first entity.

6. The method of claim 1, wherein the analysis of the social graph occurs in response to a message sender initiating a request that includes information specifying the first entity and a second entity, and the second entity is at least one message recipient selected from the plurality of message recipients to whom the message sender has addressed an electronic message.

7. The method of claim 6, wherein a visual representation of the least one connection path selected from the plurality of connection paths is presented as a linear sequence of two or more entities and indicates the association type between any two entities in the at least one connection path.

8. The method of claim 6, wherein the request is initiated via a web-based messaging application.

9. The method of claim 8, wherein the visual representation of the at least one connection path is presented as part of a user interface of the web-based messaging application for use by the message sender in composing the electronic message.

10. The method of claim 8, further comprising;
determining one or more entities to which the first entity and the second entity are both associated by analyzing the social graph; and
automatically presenting information identifying the determined one or more entities for reference by the message sender when composing at least one electronic message.

11. The method of claim 8, wherein the visual representation of the at least one connection path is presented as part of a user interface of the web-based messaging application when the message recipient receives the electronic message.

12. The method of claim 8, further comprising:
determining one or more entities to which the first entity and the second entity are both associated by analyzing the social graph; and
automatically presenting information identifying the determined one or more entities for reference by the message recipient when presented with the electronic message.

13. The method of claim 1, further comprising:
determining one or more entities to which the first entity and a second entity are both associated; and
automatically including as content of at least one electronic message, selected from the plurality of customized instances, information identifying the determined one or more entities.

14. The method of claim 1, wherein deriving the path score for each of the connection paths includes selecting a scoring algorithm for use in deriving the path score, the scoring algorithm selected to correspond with an implied or explicitly defined type of electronic message to be communicated to at least one message recipient selected from the plurality of message recipients.

15. The method of claim 1, wherein the various entities represented by nodes of the graph data structure have varying types, to include:
a person, a company, an educational institution, and a group.

16. The method of claim 1, wherein the associations represented by edges of the graph data structure have varying types, to include:
a bilateral connection between two entities;
a unilateral following relationship between two entities;
current or previous employment, by a person at a company;
matriculation, attendance or graduation, by a person at an educational institution;
membership in a group, by a person; and,
recommendation of an entity, by a person.

17. The method of claim 1, wherein an edge score assigned to an edge connecting two nodes in at least one connection path selected from the plurality of connection paths is dependent upon a type of association represented by the edge.

18. The method of claim 1, further comprising:
ordering at least one connection path connecting the first node representing the first entity with the second node by their respective path scores, wherein presenting the visual representation of the at least one connection path includes presenting a visual representation of a connection path having the highest path score.

19. A system comprising:
at least one processor for executing instructions;
a memory device in communication with the at least one processor and storing instructions representing a pathfinder module, which, when executed by the at least one processor is to:
receive a request including information identifying a first entity associated with a message sender and a plurality of message recipients to whom electronic messages are to be communicated;
responsive to receiving the request, analyze a social graph to identify a plurality of connection paths, each connection path connecting a first node representing the first entity with a second node representing at least one of the message recipients selected from the plurality of message recipients, the social graph represented by a graph data structure having nodes representing various entities and edges representing associations between entities, each edge connecting two nodes included in a connection path assigned an edge score representing an estimated strength of connection between two entities represented by the two nodes, wherein the estimated strength of connection is determined according to a shared number of nodes in the social graph that the first node and the second node have in common based on an edge type connecting the shared number of nodes with the first node and the second node;
derive a path score for at least one connection path of the plurality of connection paths by aggregating edge scores of the edges in the at least one connection path;

apply one or more user-specified filter criterion to the one or more connection paths of the plurality of connection paths to filter the one or more connection paths, the one or more filter criterion comprising at least one of: a particular entity, a particular entity type, or a specific edge type;

generate a visual representation of at least one of the one or more filtered connection paths satisfying the applied one or more filter criterion, the at least one of the one or more filtered connection paths connecting the node representing the first entity with the second node;

generate a plurality of customized instances of an electronic message by automatically modifying a generic electronic message to include information identifying entities represented by the shared number of nodes for at least one connection path of the plurality of connection paths; and facilitate presentation of the visual representation of at least one connection path selected from the plurality of connection paths within at least one generated customized instance of the electronic message addressed to at least one message recipient selected from the plurality of message recipients.

20. A non-transitory, machine-readable medium having computer-executable instructions stored thereon that, when executed by one or more hardware processors, cause a system to perform a plurality of operations comprising:

receiving information identifying a plurality of message recipients to whom electronic messages are to be communicated;

analyzing a social graph to identify a plurality of connection paths, each connection path connecting a first node representing a first entity associated with a message sender with a second node representing at least one of the message recipients selected from the plurality of message recipients specified by the message sender, the social graph represented by a graph data structure having nodes representing various entities and edges representing associations between entities, each edge connecting two nodes included in a connection path assigned an edge score representing an estimated strength of connection between two entities represented by the two nodes, wherein the estimated strength of connection is determined according to a shared number of nodes in the social graph that the first node and the second node have in common based on an edge type connecting the shared number of nodes with the first node and the second node;

deriving a path score for at least one connection path of the plurality of connection paths by aggregating edge scores of the edges in the at least one connection path;

applying one or more user-specified filter criterion to one or more connection paths of the plurality of connection paths to filter the one or more connection paths, the one or more filter criterion comprising at least one of: a particular entity, a particular entity type, or a specific edge type;

generating a visual representation of at least one of the one or more filtered connection paths satisfying the applied one or more filter criterion, the at least one of the one or more filtered connection paths connecting the first node representing the first entity with the second node;

generating a plurality of customized instances of an electronic message by automatically modifying a generic electronic message to include information identifying entities represented by the shared number of nodes for at least one connection path of the plurality of connection paths; and presenting the visual representation of at least one connection path selected from the plurality of connection paths within at least one generated customized instance of the electronic message addressed to at least one message recipient selected from the plurality of message recipients.

* * * * *

UNITED STATES PATENT AND TRADEMARK OFFICE
CERTIFICATE OF CORRECTION

PATENT NO. : 9,971,993 B2  
APPLICATION NO. : 13/430284  
DATED : May 15, 2018  
INVENTOR(S) : Cheng et al.

Page 1 of 1

It is certified that error appears in the above-identified patent and that said Letters Patent is hereby corrected as shown below:

On the Title Page

In item (75), in "Inventors", in Column 1, Line 2, delete "Mountian View," and insert --Mountain View,-- therefor On page 3, in Column 2, under "Other Publications", Line 25, delete "13/716,003." and insert --13/716,003,-- therefor Signed and Sealed this  
Thirteenth Day of August, 2019

Andrei Iancu  
*Director of the United States Patent and Trademark Office*